ив США010179512B2

United States Patent
Matsuda

(10) Patent No.: US 10,179,512 B2
(45) Date of Patent: Jan. 15, 2019

(54) VEHICLE AND ELECTRIC POWER SUPPLY UNIT INCORPORATED IN VEHICLE

(71) Applicant: Kawasaki Jukogyo Kabushiki Kaisha, Kobe-shi, Hyogo (JP)

(72) Inventor: Yoshimoto Matsuda, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 156 days.

(21) Appl. No.: 15/033,067

(22) PCT Filed: Nov. 6, 2013

(86) PCT No.: PCT/JP2013/006548
§ 371 (c)(1),
(2) Date: Apr. 28, 2016

(87) PCT Pub. No.: WO2015/068186
PCT Pub. Date: May 14, 2015

(65) Prior Publication Data
US 2016/0250928 A1    Sep. 1, 2016

(51) Int. Cl.
| | |
|---|---|
| *B60L 3/00* | (2006.01) |
| *B60L 3/04* | (2006.01) |
| *B60L 3/12* | (2006.01) |
| *B60W 10/00* | (2006.01) |
| *B60L 11/18* | (2006.01) |
| *B62M 7/02* | (2006.01) |
| *B60L 3/08* | (2006.01) |

(52) U.S. Cl.
CPC ............. *B60L 3/0046* (2013.01); *B60L 3/003* (2013.01); *B60L 3/0038* (2013.01);
(Continued)

(58) Field of Classification Search
CPC ...... B60L 3/0046; B60L 3/003; B60L 3/0038; B60L 3/0061; B60L 3/0069; B60L 3/04;
(Continued)

(56) References Cited

U.S. PATENT DOCUMENTS 5,481,460 A * 1/1996 Masaki ................. B60L 3/00
701/50
6,098,733 A * 8/2000 Ibaraki ................. B60K 6/543
180/65.28
(Continued)

FOREIGN PATENT DOCUMENTS

EP    1153783 A2    11/2001
JP    H04145810 A    5/1992
(Continued)

OTHER PUBLICATIONS

Inhibited _ Define Inhibited at Dictionary.com.pdf (https://www.dictionary.com/browse/inhibited, Inhibited | Define Inhibited at Dictionary.com, Aug. 7, 2018, pp. 1-9).*
(Continued)

*Primary Examiner* — Bao Long T Nguyen
(74) *Attorney, Agent, or Firm* — Alleman Hall Creasman & Tuttle LLP

(57) ABSTRACT

A control section is configured to perform a high-degree abnormal state control in which the control section terminates a specified shifting step for shifting a vehicle to an operable state and shifts the vehicle to an operation inhibiting state when an operation checking section determines that the vehicle is in a predetermined high-degree abnormal state, and the control section is configured to perform a low-degree abnormal state control different from a normal state control without terminating the specified shifting step, when the operation checking section determines that the vehicle is in a predetermined low-degree abnormal state different from the predetermined high-degree abnormal state, and perform the normal state control, when the operation checking section determines that the vehicle has been restored from the predetermined low-degree abnormal state to a state in which the vehicle is operable normally.

12 Claims, 6 Drawing Sheets

(52) U.S. Cl.
CPC .......... *B60L 3/0061* (2013.01); *B60L 3/0069* (2013.01); *B60L 3/04* (2013.01); *B60L 3/08* (2013.01); *B60L 3/12* (2013.01); *B60L 11/1809* (2013.01); *B60W 10/00* (2013.01); *B62M 7/02* (2013.01); *B60L 2240/421* (2013.01); *B60L 2240/423* (2013.01); *B60L 2240/425* (2013.01); *B60L 2240/525* (2013.01); *B60L 2240/526* (2013.01); *B60L 2240/545* (2013.01); *B60L 2240/547* (2013.01); *B60L 2240/549* (2013.01); *B60L 2240/80* (2013.01); *B60L 2250/00* (2013.01); *B60L 2250/10* (2013.01); *Y02T 10/642* (2013.01)

(58) Field of Classification Search
CPC .......... B60L 3/08; B60L 3/12; B60L 11/1809; B60L 2240/421; B60L 2240/423; B60L 2240/425; B60L 2240/525; B60L 2240/526; B60L 2240/545; B60L 2240/547; B60L 2240/549; B60L 2240/80; B60L 2250/00; B60L 2250/10; B60W 10/00; B62M 7/02; Y02T 10/642; G07C 5/0816
USPC ......................................... 700/22, 29.2, 33.5
See application file for complete search history.

(56) References Cited

U.S. PATENT DOCUMENTS

| | | | | |
|---|---|---|---|---|
| 8,498,772 | B2* | 7/2013 | Kanemoto | .......... F02N 11/0825 701/29.1 |
| 2001/0041955 | A1* | 11/2001 | Nada | ...................... B60K 6/445 701/29.2 |
| 2011/0068913 | A1 | 3/2011 | Bechtler et al. | |
| 2011/0202231 | A1* | 8/2011 | Ueno | ...................... F16H 61/12 701/29.2 |
| 2013/0116875 | A1* | 5/2013 | Oh | ...................... B60L 15/2045 701/22 |
| 2013/0341109 | A1* | 12/2013 | Ozaki | .................. B60L 3/0061 180/65.51 |
| 2014/0297081 | A1* | 10/2014 | Asami | .................. B60L 3/0061 701/22 |
| 2017/0113680 | A1* | 4/2017 | Shimizu | .................. B60K 6/26 |

FOREIGN PATENT DOCUMENTS

| | | |
|---|---|---|
| JP | 3184210 B2 | 7/2001 |
| JP | 2005204436 A | 7/2005 |
| JP | 2005348583 A | 12/2005 |
| JP | 2006096242 A | 4/2006 |
| JP | 2011072154 A | 4/2011 |
| JP | 2013009552 A | 1/2013 |

OTHER PUBLICATIONS

ISA Japanese Patent Office, Written Opinion of the International Searching Authority Issued in Application No. PCT/JP2013/006548, dated Dec. 10, 2013, WIPO, 7 pages.

European Patent Office, Extended European Search Report Issued in European Application No. 13897249.2, dated May 31, 2017, Germany, 10 pages.

ISA Japanese Patent Office, International Search Report Issued in Application No. PCT/JP2013/006548, dated Dec. 10, 2013, WIPO, 4 pages.

* cited by examiner

Relay

Normal state

Abnormal state

VEHICLE AND ELECTRIC POWER SUPPLY UNIT INCORPORATED IN VEHICLE

TECHNICAL FIELD

The present invention relates to a vehicle such as an electric motorcycle, and an electric power supply unit incorporated in the vehicle.

BACKGROUND ART

For an electric vehicle including as a driving power source an electric motor driven using electric energy stored in an electric power supply such as a battery, a variety of devices for detecting abnormalities in the vehicle and securing safety for a user riding in the vehicle have been developed so far.

For example, Patent Literature 1 discloses that in a case where a current output from a driving battery becomes less than a predetermined current and a vehicle speed becomes lower than a predetermined vehicle speed, relays are disconnected to disconnect the driving battery and the driving motor from each other.

CITATION LIST

Patent Literature

Patent Literature 1: Japanese Laid-Open Patent Application Publication No. 2005-348583

SUMMARY OF INVENTION

Technical Problem

However, in the above-described configuration, even in a case where an incorrect detection takes place or an instantaneous abnormality takes place and the vehicle goes back to a normal state soon thereafter, a time that passes until the vehicle can start traveling again may be long. More specifically, in this configuration, if the abnormality takes place, it is necessary to stop the vehicle, turn off a main key, and then re-start the vehicle, irrespective of whether or not the abnormality is severe. In most cases, time (about 4 to 5 seconds) is required to complete the overall system check when the vehicle re-starts. For this reason, even in a case where a minor abnormality takes place and the vehicle can go back to the normal state, because of a noise or a detection of an instantaneous abnormality, steps for re-starting the vehicle are required as in other cases. This may be inconvenient to the user.

The present invention is directed to solving the above-described problem, and an object of the present invention is to provide a vehicle and an electric power supply unit incorporated in the vehicle, which can improve convenience to the user while properly detecting the abnormality.

Solution to Problem

To achieve the object of the above-described device, according to a first aspect of the present invention, a vehicle comprises an operation checking section which performs a predetermined operation checking process to confirm whether or not the vehicle is operable normally; and a control section which controls the vehicle according to a specified shifting step of shifting the vehicle to an operable state, wherein the operation checking section is configured to perform the predetermined operation checking process to determine whether or not the vehicle is in a predetermined high-degree abnormal state or in a predetermined low-degree abnormal state different from the predetermined high-degree abnormal state, wherein the control section is configured to perform a normal state control in which the control section performs the specified shifting step and shifts the vehicle to the operable state when the operation checking section determines that the vehicle is operable normally, wherein the control section is configured to perform a high-degree abnormal state control in which the control section terminates the specified shifting step to shift the vehicle to an operation inhibiting state when the operation checking section determines that the vehicle is in the predetermined high-degree abnormal state, and wherein the control section is configured to perform a low-degree abnormal state control different from the normal state control without terminating the specified shifting step, when the operation checking section determines that the vehicle is in the predetermined low-degree abnormal state, and perform the normal state control, when the operation checking section determines that the vehicle has been restored from the predetermined low-degree abnormal state to a state in which the vehicle is operable normally.

In accordance with this configuration, an error mode (low-degree abnormal state) in which the vehicle can go back to the normal state control is provided, separately from an error mode (high-degree abnormal state) in which the step for shifting the vehicle to the operable state is terminated, when the abnormality takes place in the vehicle. For this reason, in a case where an incorrect detection takes place or a minor error takes place and the vehicle can go back to the normal state soon thereafter, the vehicle may be permitted to shift to the operable state without performing the shifting step again from the beginning, which takes time, at a time point when the minor error has been resolved. Therefore, in a case where the minor abnormality takes place and the vehicle can go back to the normal state, because of a noise or a detection of an instantaneous abnormality, this is detected, and the vehicle is permitted to go back to the normal state control quickly at the time point when this abnormality has been resolved. This can improve convenience to the user.

The vehicle may comprise an electric power supply; an electric motor which drives the vehicle using electric power supplied from the electric power supply; and a switching element which performs switching between a state in which the electric power is supplied from the electric power supply to the electric motor, and a state in which the electric power supplied from the electric power supply to the electric motor is cut off, and the operation checking section may perform the predetermined operation checking process in such a manner that the operation checking section determines whether or not the switching element is operable normally, the predetermined high-degree abnormal state may include a state in which the switching element is not operable normally, and the predetermined low-degree abnormal state may not include the state in which the switching element is not operable normally. In accordance with this configuration, in a case where the operation checking section determines that the vehicle is in the low-degree abnormal state, and thereafter the vehicle goes backs to the normal state, the vehicle can go back to the normal state control without undergoing the operation check of the switching element, which takes time.

The specified shifting step in the normal state control may be different from the specified shifting step in the low-degree abnormal state control.

The control section may be configured to perform the low-degree abnormal state control for limiting a traveling capability of the vehicle in such a manner that the control section makes the traveling capability lower in the low-degree abnormal state control than in the normal state control, when the operation checking section determines that the vehicle is in the predetermined low-degree abnormal state, and terminates limiting the traveling capability of the vehicle, when the operation checking section determines that the vehicle has been restored from the predetermined low-degree abnormal state.

The control section may be configured to perform the low-degree abnormal state control in such a manner that the control section defers performing the specified shifting step, until the operation checking section determines that the vehicle has been restored from the predetermined low-degree abnormal state, when the operation checking section determines that the vehicle is in the predetermined low-degree abnormal state.

The control section may be configured to perform the low-degree abnormal state control which is made different depending on a cause determined as being the predetermined low-degree abnormal state. In accordance with this configuration, the control section can perform more appropriate control according to the cause determined as being the predetermined low-degree abnormal state. This makes it possible for the vehicle to be easily restored from the low-degree abnormal state or urge the vehicle to shift to the high-degree abnormal state.

The control section may be configured to, when the operation checking section determines that the vehicle has been restored from the predetermined low-degree abnormal state, in a state in which the vehicle is traveling, perform gradual reduction control for gradually reducing a degree with which the traveling capability is limited, over time, or determine whether or not a predetermined timing condition in which limiting the traveling capability is terminated is met, and terminate limiting the traveling capability when the predetermined timing condition is met. In accordance with this configuration, the control section performs the above-described gradual reduction control in a period from when the vehicle shifts from the low-degree abnormal state control to the normal state control while the vehicle is traveling, or the control section places the vehicle in the stand-by state until a timing at which an impact will not be likely to occur in the vehicle even when the vehicle shifts from the low-degree abnormal state control to the normal state control. This can make it difficult to generate the impact in the vehicle when the vehicle which is traveling is restored from the low-degree abnormal state control to the normal state control. The above-described predetermined timing condition in which limiting the traveling capability is terminated may include, for example, a state in which the vehicle is stopped, a state in which the vehicle is traveling at a low speed, a state in which the vehicle is decelerating, a state in which a gear change takes place, a state in which driving power transmitted to a drive train is cut off, a regenerative state, an unaccelerated state, a state in which the accelerator operation is terminated, etc.

The control section may be configured to, when the operation checking section determines that the vehicle is in the predetermined high-degree abnormal state, maintain the operable state of the vehicle while limiting a traveling capability of the vehicle, in a state in which the vehicle is traveling, and inhibit the vehicle from shifting to the operable state, after the vehicle is stopped. In accordance with this configuration, in a case where the operation checking section determines that the vehicle is in the high-degree abnormal state while the vehicle is traveling, the control section maintains the travelable state of the vehicle while limiting the traveling capability of the vehicle. This can assist a user riding in the vehicle to pull over the vehicle to the side of a road, for example. After the vehicle is stopped, the control section inhibits the vehicle from shifting to the operable state until the operation checking section determines again that the vehicle is operable normally. In this way, the reliability and stability of the system can be secured.

The vehicle may comprise an abnormality detector which detects an abnormality of the vehicle, the operation checking section may be configured to determine that the vehicle is in the predetermined low-degree abnormal state, when a detected value from the abnormality detector falls outside a first predetermined range and falls into a second predetermined range including the first predetermined range, and determine that the vehicle is in the predetermined high-degree abnormal state, when the detected value from the abnormality detector falls outside the second predetermined range. In accordance with this configuration, even in a case where a minor error takes place and the vehicle can go back to the normal state, if the detected value from the abnormality detector significantly exceeds the first predetermined range which may be assumed as the normal range, the operation checking section determines that the vehicle is in the high-degree abnormal state. In this way, the determination as to whether or not to terminate the step of shifting the vehicle to the operable state is deferred. This makes it possible to absorb a tolerance, a variation, or a noise, and improve the reliability and stability of the system.

The abnormality detector may include a first detector which detects a first predetermined characteristic of the vehicle, and a second detector which detects a second predetermined characteristic of the vehicle which is different from the first characteristic, and the operation checking section may be configured to determine whether or not the vehicle is in the predetermined low-degree abnormal state based on the first characteristic, and determine whether or not the vehicle is in the predetermined high-degree abnormal state based on the second characteristic. In accordance with this configuration, the characteristic used to determine whether or not the vehicle is in the low-degree abnormal state is different from the characteristic used to determine whether or not the vehicle is in the high-degree abnormal state. In this way, the indication of the minor error in which the vehicle can go back to the normal state, and the indication of the error in which the vehicle cannot go back to the normal state are set to correspond to the different characteristics, respectively. This makes it possible to optimally set the error in which the vehicle can go back to the normal state and the error in which the vehicle cannot go back to the normal state, according to the degree of severity of the effects of the characteristic on the vehicle.

The first detector may be configured to detect a numeric value of at least one indication indicating a state of the vehicle, and the operation checking section may be configured to determine that the vehicle is in the predetermined low-degree abnormal state, when the numeric value falls outside a predetermined range. Indications indicating the state of the vehicle include, for example, a temperature, a current value, a cooling medium flow rate, a bank angle, etc.

The second detector may be configured to detect at least one of a state abnormality of the vehicle, an electric circuit failure abnormality, a sensor failure abnormality, and a failure abnormality of a controlled target, and the operation checking section may be configured to determine that the vehicle is in the predetermined high-degree abnormal state, when the second detector detects the abnormality. The state abnormality of the vehicle includes, for example, a fall, a collision, etc. The electric circuit failure abnormality includes, for example, a ground leakage, a relay failure, an inverter failure, an electric power supply failure, etc. The failure abnormality of the controlled target includes, for example, a battery management unit (BMU) failure, a relay failure, an inverter failure, an electric power supply failure, a motor failure, etc.

The vehicle may comprise: a notification section which notifies a user riding in the vehicle of an abnormality when the operation checking section determines that the vehicle has the abnormality, and the notification section may be configured to make a notification method different between the predetermined low-degree abnormal state and the predetermined high-degree abnormal state. In accordance with this configuration, the user riding in the vehicle can quickly know whether the vehicle is in the low-degree abnormal state or in the high-degree abnormal state, when the abnormality takes place.

According to another aspect of the present invention, an electric power supply unit may comprise: an electric power supply which stores therein electric power used to drive a vehicle; an operation checking section which performs a predetermined operation checking process to confirm whether or not a normal charging operation for the electric power supply is allowed to take place; and a control section which controls a charging operation for the electric power supply according to a specified shifting step for shifting the vehicle to a chargeable state, wherein the operation checking section is configured to perform the predetermined operation checking process to determine whether or not the vehicle is in a predetermined high-degree abnormal state or in a predetermined low-degree abnormal state different from the predetermined high-degree abnormal state, wherein the control section is configured to perform a normal state control in which the control section performs the specified shifting step and shifts the vehicle to the chargeable state for the electric power supply, when the operation checking section determines that the normal charging operation for the electric power supply is allowed to take place, wherein the control section is configured to perform a high-degree abnormal state control in which the control section terminates the specified shifting step and shifts the vehicle to a state in which the normal charging operation for the electric power supply is inhibited, when the operation checking section determines that the vehicle is in the predetermined high-degree abnormal state, and wherein the control section is configured to perform a low-degree abnormal state control different from the normal state control without terminating the specified shifting step, when the operation checking section determines that the vehicle is in the predetermined low-degree abnormal state, and perform the normal state control, when the operation checking section determines that the vehicle has been restored from the predetermined low-degree abnormal state to a state in which the normal charging operation for the electric power supply is allowed to take place.

In accordance with this configuration, an error mode (low-degree abnormal state) in which the vehicle can go back to the normal state control is provided, separately from an error mode (high-degree abnormal state) in which the step for shifting the vehicle to the chargeable state for the electric power supply is terminated, when the abnormality takes place in the vehicle. For this reason, in a case where an incorrect detection takes place or a minor error takes place and the vehicle can go back to the normal state soon thereafter, the vehicle may be permitted to shift to the chargeable state without performing the shifting step again from the beginning, which takes time, at a time point when the minor error has been resolved. Therefore, in a case where the minor abnormality takes place and the vehicle can go back to the normal state, because of a noise or a detection of an instantaneous abnormality, this is detected, and the vehicle is permitted to go back to the normal state control quickly at the time point when this abnormality has been resolved. This can improve convenience to the user.

The above and further objects, features, and advantages of the present invention will more fully be apparent from the following detailed description of a preferred embodiment with reference to the accompanying drawings.

Advantageous Effects of Invention

In accordance with a vehicle and an electric power supply unit incorporated in the vehicle, it becomes possible to improve convenience to the user while properly detecting the abnormality.

DESCRIPTION OF EMBODIMENTS

Figure 1:
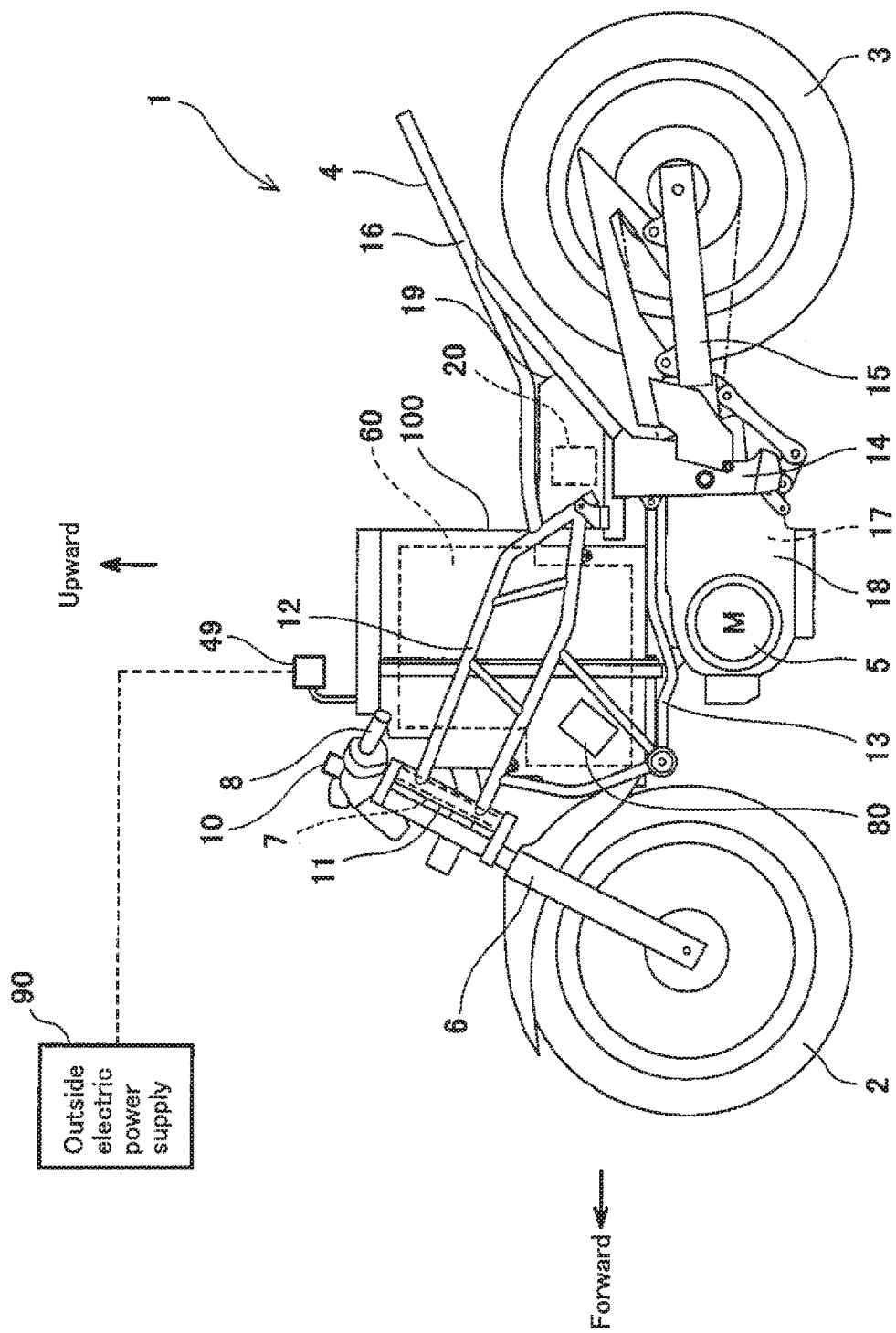
FIG. 1 is a left side view showing an electric motorcycle according to an embodiment of the present invention.

Hereinafter, the embodiment of the present invention will be described with reference to the drawings. Throughout the drawings, the same or corresponding components are designated by the same reference characters and will not be described repeatedly, unless otherwise noted.

In the embodiment described below, an electric motorcycle including an electric motor will be exemplarily described as a vehicle to which the present invention is applied. However, the vehicle to which the present invention is applied is not limited to the electric motorcycle. The present invention is also applicable to, for example, another straddle-type electric vehicle (electric three-wheeled vehicle, etc.), an electric four-wheeled vehicle having a residence space, such as a multi-purpose vehicle, a vehicle such as a personal watercraft other than the wheeled vehicle, etc. Further, the present invention is applicable to a hybrid vehicle including an internal combustion engine in addition to the electric motor, or a vehicle which uses only driving power generated by the internal combustion engine.

FIG. 1 is a left side view showing an electric motorcycle according an embodiment of the present invention. As shown in FIG. 1, an electric motorcycle 1 of the present embodiment includes a front wheel 2 which is a driven wheel, a rear wheel 3 which is a drive wheel, a vehicle body frame 4 placed between the front wheel 2 and the rear wheel 3, and an electric motor 5 mounted to the vehicle body frame 4. The electric motorcycle 1 does not include the internal combustion engine, and is configured to rotate the rear wheel 3 using driving power generated in the electric motor 5 driven using electric power supplied from an electric power supply.

The front wheel 2 is rotatably mounted to the lower portion of a front fork 6 extending substantially vertically in such a manner that the front fork 6 is inclined at a caster angle. A steering shaft 7 is connected to the upper portion of the front fork 6. A bar-type handle 8 is attached to the upper portion of the steering shaft 7. A right grip of the handle 8 is configured as a throttle grip operated by a rider to adjust the driving power generated in the electric motor 5. A cylinder lock 10 is placed in the vicinity of the handle 8.

The vehicle body frame 4 includes a head pipe 11, a pair of right and left and a pair of upper and lower main frames 12, a pair of right and left down frames 13, a pair of right and left pivot frames 14, a pair of right and left swing arms 15, and a seat frame 16. The steering shaft 7 is rotatably mounted to the head pipe 11. The seat frame 16 supports a seat (not shown) which can be straddled by the rider and a passenger which are arranged side by side in a forward and rearward direction.

The electric motor 5 is placed in a region which is below the down frames 13 and in front of the pivot frames 14. The driving power generated in the electric motor 5 is transmitted to the rear wheel 3 via a driving power transmission mechanism 17. The electric motor 5 is accommodated in a motor case 18. The motor case 18 accommodates therein a transmission 17a included in the driving power transmission mechanism 17, together with the electric motor 5. The motor case 18 is suspended from the down frames 13 and the pivot frames 14.

The electric motorcycle 1 includes an inverter case 19 and a battery unit 100 in addition to the motor case 18 accommodating the electric motor 5 therein. The inverter case 19 accommodates therein electric components including an inverter 20. The battery unit 100 accommodates therein electric components including a battery pack 60 which is an electric power supply. The inverter case 19 is surrounded by the main frames 12, the pivot frames 14, and the seat frame 16, and placed in a space having a substantially inverted-triangle shape when viewed from the side. The inverter case 19 is placed immediately behind the lower rear end portion of the battery unit 100. The battery unit 100 is placed in a space which is formed between the pair of right and left main frames 12, above the lower end portions of the pair of right and left down frames 13, and in front of the pivot frames 14.

The battery unit 100 is provided with a charging connector 49 used to charge the battery pack 60 with the electric power supplied from an outside electric power supply 90 for charging, which is provided outside the electric motorcycle 1. For example, the charging connector 49 may have a fitting portion exposed in the outer surface of the battery unit 100, or may be placed in the opening (charging port) of the battery unit 100, and the opening may be covered by a specified cover.

Figure 2:
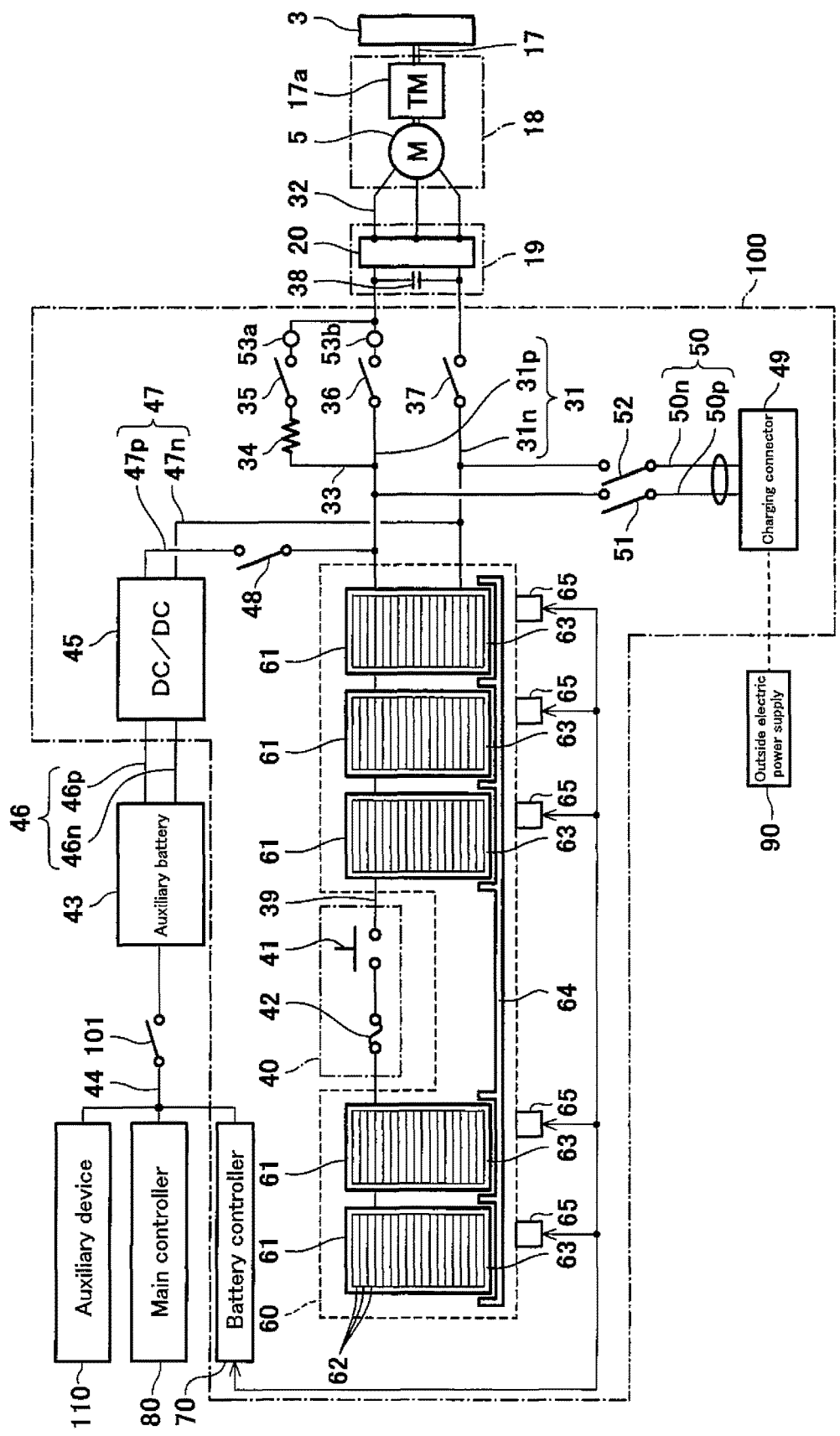
FIG. 2 is a block diagram showing the exemplary configuration of an electric system of the electric motorcycle of FIG. 1.

FIG. 2 is a block diagram showing the exemplary configuration of an electric system of the electric motorcycle of FIG. 1. FIG. 2 mainly shows a flow of driving electric power between the electric power supply (battery pack 60) and the electric motor 5. As shown in FIG. 2, the battery pack 60 includes a plurality of battery modules 61, and a battery frame 64, and is configured as a unit which functions as a high-voltage and direct-current single secondary battery. Each of the battery modules 61 includes a plurality of battery cells 62, and a module casing 63 of a rectangular parallelepiped shape, which accommodates the plurality of battery cells 62 therein. In the present embodiment, each of the battery cells 62 is a secondary battery configured to store DC power, such as a lithium ion battery or a nickel hydride battery. Instead of using the battery pack 60 including the secondary batteries, a capacitor such as an electric double layer capacitor may be used as the electric power supply.

The plurality of battery cells 62 are aligned inside the module casing 63, and electrically connected in series. The plurality of battery modules 61 are connected and fastened to the battery frame 64 in a state in which the battery modules 61 are densely packed in the interior of the battery pack 60. The plurality of battery modules 61 are electrically connected in series.

As described above, the battery pack 60 includes many battery cells 62 which are electrically connected in series. As a result, the battery pack 60 functions as the secondary battery of a high voltage (e.g., 200 V to 300 V).

Each of the plurality of battery modules 61 is provided with a cell monitoring unit (CMU) 65 which monitors the voltage and temperature of each of the battery cells 62. The cell monitoring unit 65 detects the voltage and temperature of each of the battery cells 62 and sends detected data to a battery controller 70. The battery controller 70 performs charging and discharging control for each of the battery modules 61 based on data received from the cell monitoring unit 65.

The battery pack 60 is electrically connected to the charging connector 49 via a charging wire 50 including a positive charging wire 50p and a negative charging wire 50n. A positive charging relay 51 is provided on the positive charging wire 50p, while a negative charging relay 52 is provided on the negative charging wire 50n. Hereinafter, in some cases, the positive charging relay 51 and the negative charging relay 52 will be collectively referred to as charging relays 51, 52, respectively. The charging connector 49 is electrically connected to the outside electric power supply 90 for charging the battery pack 60.

The battery pack 60 is electrically connected to the inverter 20 via a high-voltage electric wire 31 including a positive power wire 31p and a negative power wire 31n. The inverter 20 converts high-voltage DC power sent from the battery pack 60 into three-phase AC power in accordance with a torque command or the like, from a main controller 80. The three-phase AC power is supplied to the electric motor 5 via a three-phase AC wire 32. The electric motor 5 operates using the AC power supplied from the inverter 20 and generates driving power for the electric motorcycle 1 to travel, corresponding to electric characteristics such as a current.

On the positive power wire 31p of the high-voltage electric wire 31, a positive inverter relay 36 is provided. A bypass wire 33 is placed in parallel with the positive inverter relay 36 to form a bypass circuit from the positive power wire 31p. On the bypass wire 33, a current steering resistor 34 and an inrush current prevention relay 35 are arranged in series. On the negative power wire 31n of the high-voltage electric wire 31, a negative inverter relay 37 is provided. The relays 35 to 37 function as switching elements for performing switching between a state in which the electric power is supplied from the battery pack 60 as the electric power supply to the electric motor 5, and a state in which the electric power supplied from the battery pack 60 to the electric motor 5 is cut off. Hereinafter, in some cases, the relays 35 to 37 will be collectively referred to as traveling relays.

Current sensors are provided on the positive power wire 31$p$, the negative power wire 31$n$, and/or the bypass wire 33. In the present embodiment, as shown in FIG. 2, a current sensor 53$a$ is provided on the bypass wire 33, and a current sensor 53$b$ is provided on the positive power wire 31$p$ in a location that is inward relative to the path of the bypass wire 33.

On a connection wire 39 connecting the adjacent battery modules 61 to each other, a service plug 40 is provided. The service plug 40 includes a plug 41 which performs switching between the continuity state and disconnected state of the connection wire 39, and a fuse 42 which disconnects the connection wire 39 when an excess current flows therethrough. A maintenance operator manually operates the plug 41 to choose a state in which the connection wire 39 is in the continuity state and the electric power can be supplied from the battery pack 60 to the electric motor 5, or a state in which the connection wire 39 is disconnected and the electric power supplied from the battery pack 60 to the electric motor 5 is cut off The electric motorcycle 1 includes an auxiliary battery 43 which is a secondary battery as a low-voltage DC electric power supply (e.g., DC12V), separately from the battery pack 60 which serves as the electric power supply for the electric motor 5. The auxiliary battery 43 is connected to a power load (auxiliary device) different from the electric motor 5 via a low-voltage electric wire 44. The power load which uses the auxiliary battery 43 as the electric power supply includes, for example, the battery controller (also referred to as battery management unit (BMU)) 70 which monitors the state of charge (SOC) of the battery pack 60, the inverter 20, sensors, and a main controller (also referred to as EV-ECU or VCU) 80. The main controller 80 is configured as a control device which controls the whole of the electric motorcycle 1, including control for driving the inverter 20.

In addition, the power load which uses the auxiliary battery 43 as the electric power supply includes lighting units such as a head lamp, a tail lamp, and a direction indicator lamp, a speed display unit, and a notification unit 120 (see FIG. 3) such as an abnormality notification unit. The notification unit 120 also includes a display lamp, and a gauge such as a speed meter, a display unit such as a liquid crystal screen or the like which displays information, and a speaker which emits an alarm sound, an operation sound, an abnormality notification sound, a guidance sound, etc. In the example of FIG. 2, these power loads are shown collectively as the auxiliary device 110.

On the low-voltage electric wire 44 connecting the auxiliary battery 43, the main controller 80, the auxiliary device 110, and the battery controller 70 to each other, a low-voltage relay 101 is provided. The battery controller 70 operates the traveling relays 35 to 37 to disconnect the high-voltage electric wire 31 extending between the battery pack 60 and the inverter 20 when the electric power is not supplied from the battery pack 60 to the inverter 20 (e.g., during a charging mode). Also, the battery controller 70 operates the traveling relays 35 to 37 to connect the high-voltage electric wire 31 extending between the battery pack 60 and the inverter 20 when the electric power is supplied from the battery pack 60 to the inverter 20 (e.g., during a discharging mode).

The auxiliary battery 43 is connected to a DC/DC converter 45 via a low-voltage converter wire 46 including a positive power wire 46$p$ and a negative power wire 46$n$. The DC/DC converter 45 is connected to the positive power wire 31$p$ and the negative power wire 31$n$ of the high-voltage electric wire 31 via a high-voltage converter wire 47 including a positive power wire 47$p$ and a negative power wire 47$n$. On the positive power wire 47$p$ and the negative power wire 47$n$ of the high-voltage converter wire 47, a DC/DC converter relay 48 is provided. In the example of FIG. 2, the DC/DC converter relay 48 is provided on the high-voltage power wire 47$p$. The battery controller 70 provides an open/close command to the DC/DC converter relay 48.

In the above-described manner, the battery controller 70 provides commands to the relays 35 to 37, 48, and 51 to 52, to switch connection or disconnection of the corresponding wires.

During the discharging mode in which the battery pack 60 is connected to the electric motor 5, the electric motor 5 is driven using the electric power supplied from the battery pack 60 for the electric 1 to travel. Further, during deceleration of the electric motorcycle 1, the electric motor 5 operates as a generator. In this case, the inverter 20 converts the AC power (regenerative electric power) generated in the electric motor 5 into the DC power. The battery pack 60 is charged with the DC power.

During the charging mode in which the battery pack 60 is connected to the outside electric power supply 90 via the charging connector 49, the battery pack 60 is charged with the electric power supplied from the outside electric power supply 90. In addition, the auxiliary battery 43 can be charged with the electric power supplied from the outside electric power supply 90. Further, the DC/DC converter 45 can convert the DC power stored in the battery pack 60 into the DC power for the auxiliary battery 43, and the auxiliary battery 43 can be charged with this DC power.

Figure 3:
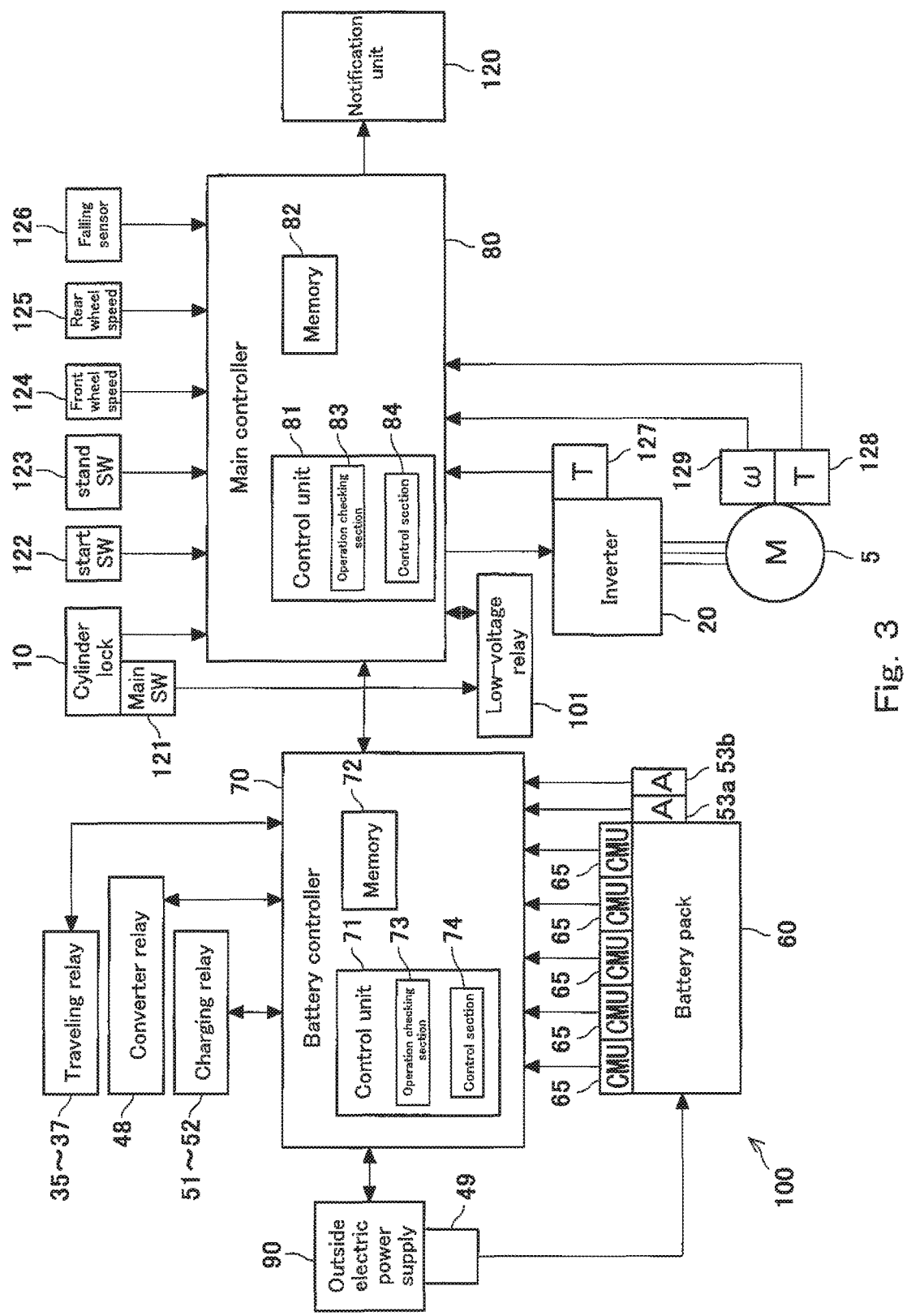
FIG. 3 is a block diagram showing a control system of the electric system of the electric motorcycle of FIG. 1.

FIG. 3 is a block diagram showing a control system of the electric system of the electric motorcycle of FIG. 1. As shown in FIG. 3, the electric motorcycle 1 of the present embodiment is controlled primarily by the main controller 80 and the battery controller 70. The main controller 80 includes a control unit 81 such as a microcontroller, and a memory 82 which stores a variety of information therein, while the battery controller 70 includes a control unit 71 such as a microcontroller, and a memory 72 which stores a variety of information therein. The control unit 81 of the main controller 80 functions as an operation checking section 83 and a control section 84 which will be described later, and the control unit 71 of the battery controller 70 functions as an operation checking section 73 and a control section 74 which will be described later.

The cylinder lock 10, a main switch 121 incorporated into the cylinder lock 10 to perform switching between ON and OFF of the auxiliary battery 43, a start switch 122 provided in the vicinity of the handle 8, a side stand switch 123 which detects whether a side stand (not shown) supporting the electric motorcycle 1 during parking of the electric motorcycle 1 is deployed (during parking) or stowed (during traveling), a front wheel vehicle speed sensor 124 which detects the rotational speed of the front wheel 2, a rear wheel vehicle speed sensor 125 which detects the rotational speed of the rear wheel 3, and a falling sensor 126 which detects whether or not the electric motorcycle 1 has fallen, based on the bank angle of the vehicle body of the electric motorcycle 1, are connected to the main controller 80.

In addition, an inverter temperature sensor 127 which detects the temperature of the inverter 2, a motor temperature sensor 128 which detects the temperature of the electric motor 5, and a rotational speed sensor 129 which detects the rotational speed of the electric motor 5 are connected to the main controller 80. A rotational speed sensor such as a resolver is used as the rotational speed sensor 129. The sensors connected to the main controller 80 are not limited to the above. For example, a gear position sensor, a traveling mode switch command sensor, an acceleration sensor, an accelerator sensor, a brake sensor, a connection determination sensor of the charging connector, a sensor which determines whether or not the electric power is supplied via the charging connector, etc., which are not shown, are connected to the main controller 80 in the same manner.

The main controller 80 provides a control command to the battery controller 70 or the inverter 20 in response to the information or commands from the above-described switches or sensors. Also, the main controller 80 provides information of the states of the electric motorcycle 1 to the notification unit 120.

Further, the main controller 80 is connected to the low-voltage relay 101. When an abnormality has occurred in the auxiliary battery 43, the main controller 80 disconnects this relay. Also, the main controller 80 detects the operation state of the low-voltage relay 101, and knows the presence/absence of the abnormality in the low-voltage relay 101.

The cell monitoring units 65 provided to correspond to the plurality of battery modules 61 of the battery pack 60, respectively, and the current sensors 53a, 53b which detect a current flowing through the battery pack 60, are connected to the battery controller 70. Each of the cell monitoring units 65 detects the voltage and temperature of the corresponding battery module 61, and sends the detected information to the battery controller 70. In other words, the cell monitoring unit 65 is capable of functioning as the voltage sensor or the temperature sensor of the battery pack 60. The battery controller 70 performs the voltage management of the battery pack 60 based on the voltage and temperature of the battery module 61 which are sent from each of the cell monitoring units 65, and the current of the battery pack 60 which is sent from the current sensors 53a, 53b.

The battery controller 70 is connected to the traveling relays 35 to 37, the DC/DC converter relay 48 and the charging relays 51, 52. The battery controller 70 disconnects these relays when the abnormality has occurred in the electric motorcycle 1 or the battery unit 100. In addition, the battery controller 70 detects the operation states of the relays 35 to 37, 48, 51, 52 and knows the presence/absence of the abnormalities in the operation states of the relays 35 to 37, 48, 51, 52.

The falling sensor 126, the inverter temperature sensor 127, the motor temperature sensor 128, the rotational speed sensor 129, the cell monitoring units 65, the current sensors 53a, 53b, and the relays 35 to 37, 48, 51, 52, 101 function as abnormality detectors which detect the abnormalities in the electric motorcycle 1. The falling sensor 126 detects as the abnormality a state in which the vehicle body of the electric motorcycle 1 is tilted at a predetermined angle or more. Each of the inverter temperature sensor 127 and the motor temperature sensor 128 detects as the abnormality a state in which the detected temperature is equal to or higher than a predetermined temperature. The rotational speed sensor 129 detects as the abnormality a state in which a difference between the detected rotational speed of the electric motor 5 and the command value of the main controller 80 is equal to or greater than a predetermined value. The cell monitoring units 65 and the current sensors 53a, 53b detect as the abnormalities a state in which the voltages, temperatures, and currents in the battery unit 100 are equal to or greater than predetermined values, respectively.

The cylinder lock 10 is used as an input device which performs switching to select permission of charging or permission of traveling. The cylinder lock 10 is used to switch the main switch 121, and lock the vehicle body. The cylinder lock 10 is configured in such a manner that a key hole is movable among a plurality of predetermined positions. A sensor attached to the cylinder lock 10 sends a signal indicating the key hole position to the main controller 80. The cylinder lock 10 is configured to shift the key hole position by rotating a mechanical key inserted into the key hole. The main controller 80 is configured to shift the control mode based on the signal indicating the key hole position, which is provided by the cylinder lock 10. The main switch 121 is configured to be turned ON or OFF based on the signal indicating the key hole position, which is provided by the cylinder lock 10. In a state in which the mechanical key is disengaged from the key hole, the rotation of the key hole is inhibited. The key hole position includes a lock position, a main switch OFF position, a main switch ON position, and a charging position. The information indicating the key hole position of the cylinder lock 10 is sent to the main controller 80.

Figure 4:
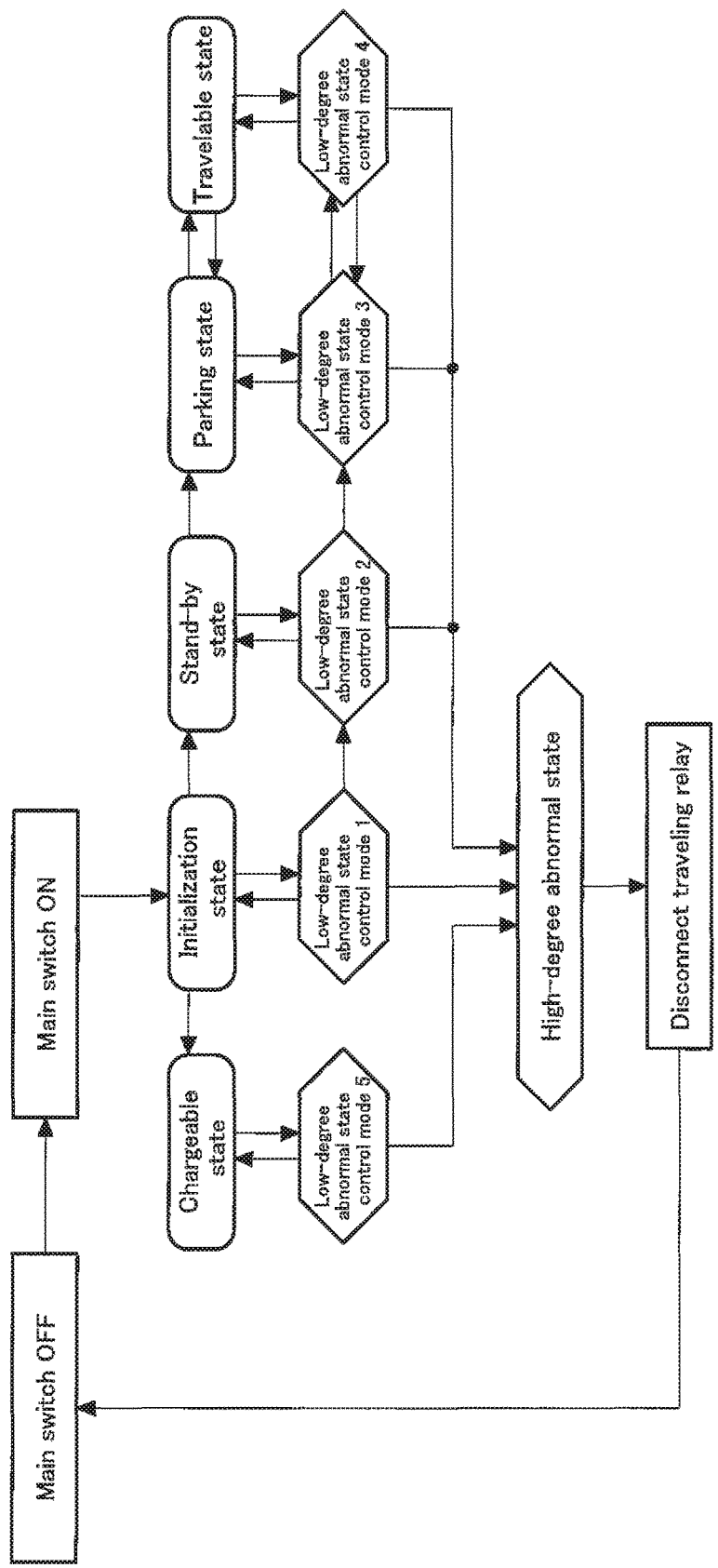
FIG. 4 is a diagram showing how the operation state of the electric motorcycle of FIG. 1 shifts.

FIG. 4 is a diagram showing how the operation state of the electric motorcycle of FIG. 1 shifts. When the key hole position of the cylinder lock 10 is set in the main switch ON position, the auxiliary battery 43 starts to supply the electric power to the main controller 80, the battery controller 70, and the auxiliary device 110, and thus the controllers 80, 70 can initiate control. In order to shift an initialization state in which an initial operation checking process is performed to a travelable state, shifting steps are set so that the electric motorcycle 1 undergoes at least one operation state.

In the present embodiment, as shown in FIG. 4, the operation state during the normal operation of the electric motorcycle 1 includes the initialization state in which an initial operation checking process is performed when the key hole position of the cylinder lock 10 is set in the main switch ON position, a stand-by state which takes place after the initial operation checking process is performed in the initialization state, a parking state in which the electric motorcycle 1 can travel using the electric power, a travelable state (first operable state) in which the electric motorcycle 1 can travel actually by the operation of the user riding in the electric motorcycle 1, and a chargeable state (second operable state) in which the key hole position of cylinder lock 10 is set in the charging position. The key hole positions of the cylinder lock 10 are arranged in the order of the charging position, the main switch OFF position, and the main switch ON position. In this arrangement, the cylinder lock 10 cannot be shifted from the main switch ON position to the charging position without undergoing the main switch OFF position. Therefore, it is necessary to undergo a step for turning OFF the main switch 121 to charge the electric motorcycle 1 in the travelable state. Likewise, it is necessary to undergo a step of turning OFF the main switch 121 to allow the electric motorcycle 1 in the chargeable state to travel.

In the shifting step during the normal state control, when the rider performs an operation for preparing to start the electric motorcycle 1 (in the present embodiment, the operation for inserting the cylinder key into the cylinder lock 10 and setting the key hole position in the main switch ON position), the electric motorcycle 1 shifts to the initialization state, and the initial operation checking process is performed. When the initial operation checking process is completed, the electric motorcycle 1 shifts to the stand-by state. In the stand-by state, when the rider performs an operation for traveling the electric motorcycle 1 (in the present embodiment, operation for turning ON the start switch 122), the electric motorcycle 1 shifts to the parking state. In the parking state, when a travelable condition (in the present embodiment, the side stand is stowed) is met, the electric motorcycle 1 shifts to the travelable state. If the side stand becomes deployed in the travelable state, the electric motorcycle 1 goes back to the parking state.

In the above-described manner, for each of the operation states, the predetermined step (specifically, the step performed to reach the operable state of the electric motorcycle 1) required to shift the electric motorcycle 1 to a next operation state and a control method in the low-degree abnormal state are set. To shift the electric motorcycle 1 from the stand-by state to the parking state, the ON-operation of the starter switch 122 is set as the required step. To shift the electric motorcycle 1 from the parking state to the travelable state, the OFF-operation of the side stand switch 123 (the side stand is stowed and the side stand switch 123 is OFF) is set as the required step. The control unit 81 of the main controller 80 functions as the control section 84 which controls the electric motorcycle 1 according to the above-described shifting steps.

When the key hole position of the cylinder lock 10 is shifted from the main switch ON position or the charging position to the main switch OFF position, the low-voltage relay 101 is disconnected, and the electric power supplied from the auxiliary battery 43 to the main controller 80, the battery controller 70, and the auxiliary device 110 is cut off. In this state, the electric motorcycle 1 is shut-down, and no control takes place. When the key hole position of the cylinder lock 10 is shifted from the main switch OFF position to the main switch ON position or the charging position, the low-voltage relay 101 is connected, and the electric power is supplied from the auxiliary battery 43 to the main controller 80, the battery controller 70, and the auxiliary device 110. In this way, these devices become electrically operable.

Figure 5:
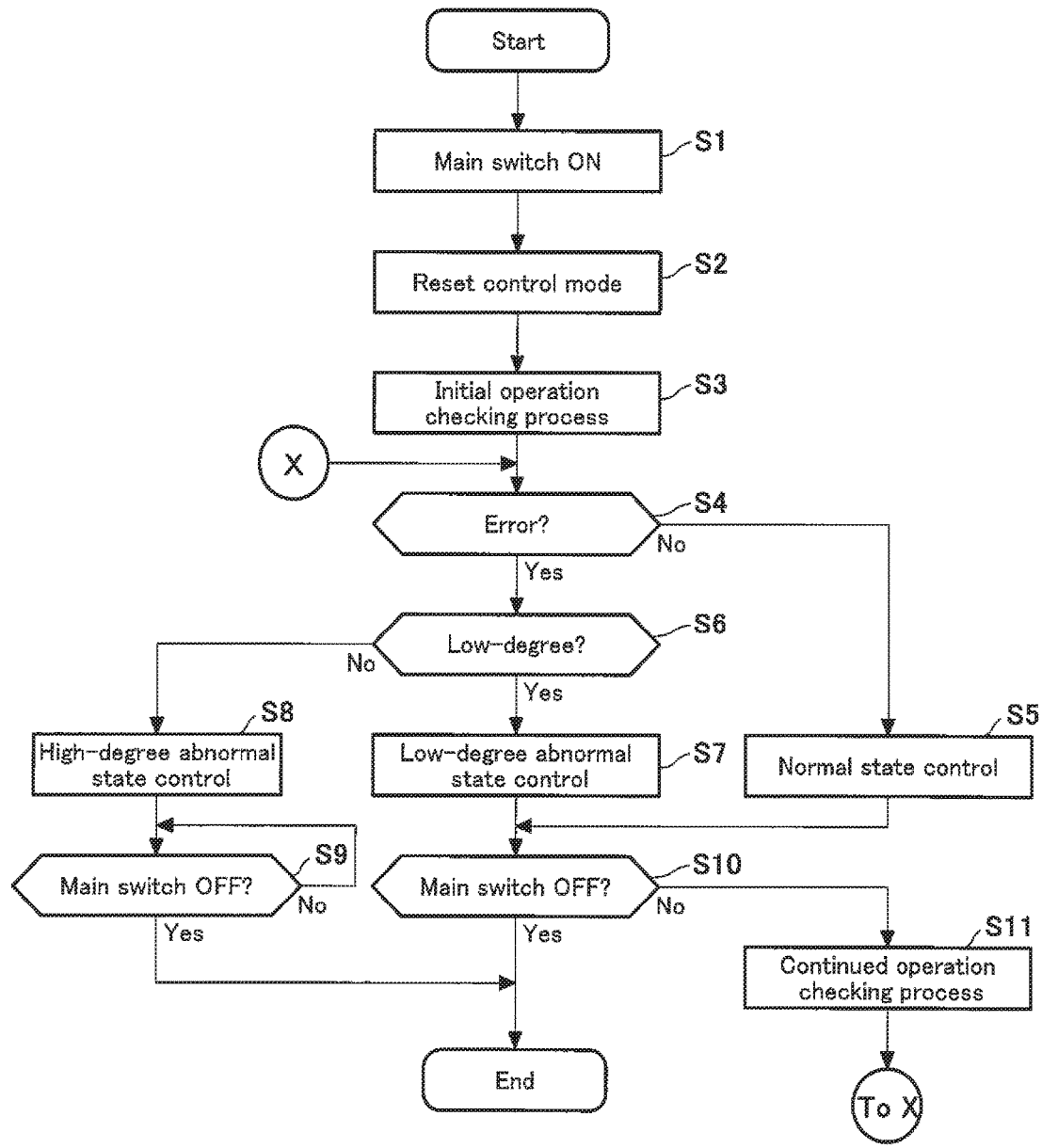
FIG. 5 is a flowchart showing the flow of a control for checking the operation of the electric motorcycle of FIG. 1.

FIG. 5 is a flowchart showing the flow of control for checking the operation of the electric motorcycle of FIG. 1. When the control unit 81 of the main controller 80 detects that the cylinder lock 10 is placed in the main switch ON position (step S1), the control unit 81 operates as the operation checking section 83. The control unit 71 of the battery controller 70 outputs the detected values associated with the battery unit 100 to the main controller 70, and connects or disconnects the relays in response to the command from the main controller 80. In other words, in the shifting steps which take place from when the main switch 121 is turned ON until the electric motorcycle 1 reaches the travelable state, and in the travelable state, the main controller 80 operates as a master and the battery controller 70 operates as a slave. The operation checking section 83 resets a control mode (a normal state control mode, a low-degree abnormal state control mode, and a high-degree abnormal state control mode which will be described later) (step S2), and performs a predetermined initial operation checking process to check whether or not the electric motorcycle 1 is operable normally (step S3).

The initial operation checking process includes, for example, determination of whether or not the detected values from the sensors fall within predetermined ranges, respectively. In addition, the initial operation checking process includes a system check (initialization operation) in which the operations are checked in a state in which the relays are actually connected or disconnected. The control unit 71 of the battery controller 70 sends data from the operation check of the relays and the detected values associated with the battery unit 100, such as voltages, temperatures, and the like, which are detected by the cell monitoring devices 65, to the control unit 81 of the main controller 80. The control unit 81 performs the operation checking process for the battery unit 100 as the operation checking section 83. In addition, the control unit 81 of the main controller 80 operates as the operation checking section 83 which performs an operation checking process for the components different from the battery unit 100, such as abnormal state check based on the detected values of the temperatures and the like of the inverter 20 and the electric motor 5.

Figure 6:
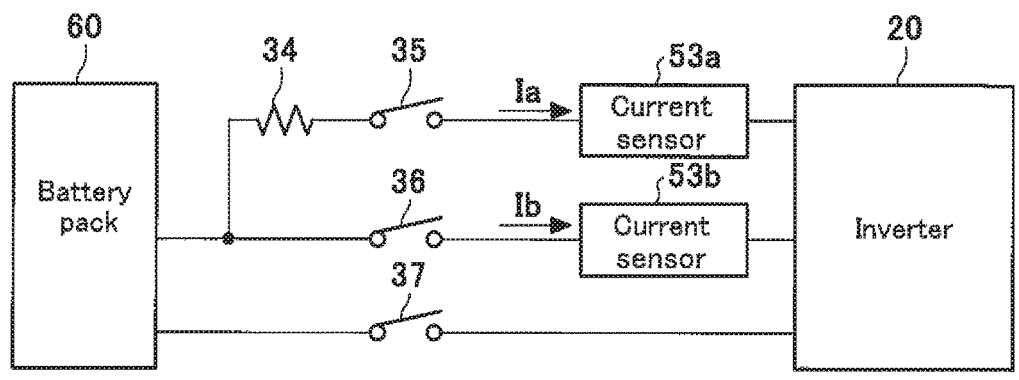
FIG. 6 is a diagram schematically showing an exemplary system check of the electric motorcycle of FIG. 1.
Figure 6:
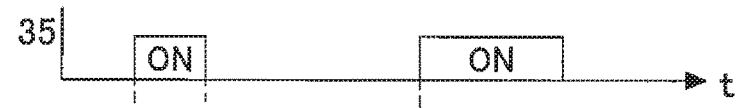
Figure 6:
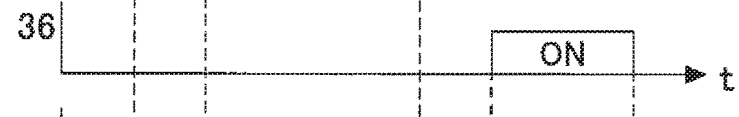
Figure 6:
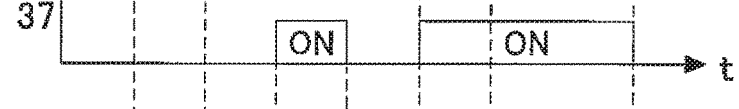
Figure 6:
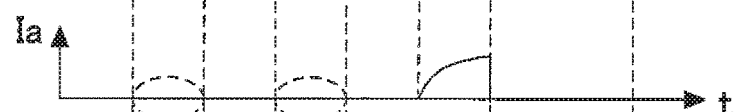
Figure 6:
Figure 6:
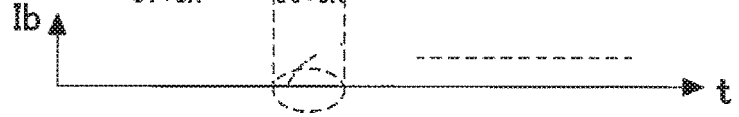

FIG. 6 is a diagram schematically showing an exemplary system check of the electric motorcycle of FIG. 1. FIG. 6 exemplarily shows the operation check of the traveling relays 35, 36, 37. FIG. 6 shows the layout of the relays 35, 36, 37 between the battery unit 100 and the inverter 20, a graph representing the timing at which the relays 35, 36, 37 are connected, a graph representing the detected values of the current sensors 53a, 53b in the normal state, and a graph representing the detected values of the current sensors 53a, 53b in the abnormal state, in this order from the upper side. In the present embodiment, a state in which adjacent wires of each of the relays are connected to each other will be referred to "ON", and a state in which adjacent wires of each of the relays are disconnected from each other will be referred to "OFF".

Initially, the control unit 71 of the battery controller 70 causes the traveling relay (inrush current preventing relay) 35 on the bypass wire 33 to be ON in a state in which all of the traveling relays 35 to 37 are OFF. At this time, the traveling relays 36, 37 associated with the inverter 20 remain OFF. In this state, the negative traveling relay 37 is OFF, and no current flows to the inverter 20. Therefore, in the normal state, the current Ia flowing through the current sensor 53a and the current Ib flowing through the current sensor 53b are zero. In view of this, the control unit 81 of the main controller 80 which operates as the operation checking section 83 can confirm that the disconnected state of the negative traveling relay 37 is proper by detecting the current Ia flowing through the current sensor 53a, which is sent from the battery controller 70 to the main controller 80.

Then, the control unit 71 of the battery controller 70 causes the negative traveling relay 37 to be ON again in a state in which the traveling relays 35 to 37 are OFF. At this time, the traveling relays 35, 36 associated with the inverter 20 remain OFF. In this state, the positive traveling relays 35, 36 are OFF, and therefore no current flows to the inverter 20. Therefore, in a normal state, the current Ia and the current Ib are zero. The control unit 81 of the main controller 80 which operates as the operation checking section 83 detects the current Ia flowing through the current sensor 53a, which is sent from the battery controller 70 to the main controller 80, and thereby confirms that the disconnected state of the traveling relay 35 is proper. The control unit 81 detects the current Ib flowing through the current sensor 53b, which is sent from the battery controller 70 to the main controller 80, and thereby confirms that the disconnected state of the traveling relay 36 is proper.

For example, as shown in FIG. 6, in a case where the current Ia is changed when only the negative traveling relay 37 is ON, it may be determined that the disconnected state of the traveling relay 35 on the bypass wire 33 is abnormal. Likewise, in a case where the current Ib is changed when only the negative traveling relay 37 is ON, it may be determined that the disconnected state of the traveling relay 36 is abnormal. In a case where the current Ia and the current Ib are changed when at least one of the positive traveling relays 35, 36 is ON and the negative traveling relay 37 is OFF, it may be determined that the disconnected state of the traveling relay 37 is abnormal.

The control unit 71 of the battery controller 70 causes the traveling relay 35 on the bypass wire 33 and the negative traveling relay 37 to be ON, in a state in which the traveling relays 35 to 37 are OFF. In this case, a current flows to the inverter 20 through the bypass wire 33. Therefore, in the normal state, the current Ia is changed. Since the current steering resistor 34 is provided on the bypass wire 33, the current Ia detected by the current sensor 53a has a waveform which gradually rises up to a predetermined value. Therefore, the operation checking section 83 can confirm that the connected states of the traveling relays 35, 37 are proper by detecting the current Ia flowing through the current sensor 53a.

The control unit 71 of the battery controller 70 causes the traveling relay 36 to be ON, in a state in which the traveling relays 35, 37 are ON. In this case, since the current steering resistor 34 is provided on the bypass wire 33, no current flows through the bypass wire 33, and a current flows through the traveling relay 36 with a lower resistance. Therefore, in the normal state, the current Ia is zero and the current Ib is not zero. Since no resistor is provided on the wire on which the traveling relay 36 is provided, a current flowing through the traveling relay 36 rises steeply. Therefore, the control unit 81 of the main controller 80 which operates as the operation checking section 83 can confirm that the connected states of the traveling relays 36, 37 are proper by detecting the current Ib flowing through the current sensor 53b, which is sent from the battery controller 70 to the main controller 80.

Further, if a change in the current Ia which takes place when the traveling relays 35, 37 are ON, and a change in the current Ib which takes place when the traveling relays 36, 37 are ON are combined, it can be determined that the connected state of each of the traveling relays 35, 36, 37 is correct. For example, if either one of the change in the current Ia which takes place when the traveling relays 35, 37 are ON, and the change in the current Ib which takes place when the traveling relays 36, 37 are ON is not correct, it can be determined that the connected state of the negative traveling relay 37 is normal and the connected state of one of the positive traveling relays 35, 36 is abnormal. If both of the change in the current Ia which takes place when the traveling relays 35, 37 are ON, and the change in the current Ib which takes place when the traveling relays 36, 37 are ON are not proper, it can be determined that the connected state of at least the negative traveling relay 37 is abnormal.

In the above-described manner, in the initial operation checking process, the operation check (check of the continuity states and the disconnected states) of the relays, as the system check, is performed by actually operating the relays. The initial operation checking process requires a certain amount of time (e.g., 4 to 5 seconds).

When the control unit 71 of the battery controller 70 detects that the cylinder lock 10 is placed in the charging position, the control unit 71 operates as the operation checking section 73, and performs the initial operation checking process for the battery unit 100. In this case, the main controller 80 merely sends to the battery controller 70 the detection signals from the vehicle speed sensors 124, 125 which are used to determine whether or not the electric motorcycle 1 is moving during the charging. In other words, during the charging, the battery controller 70 operates as the master, and the main controller 80 operates as the slave. In the initial operation checking process for the battery unit 100, the above-described system check and check of the currents, voltages, and temperatures of the battery pack 60 are also performed. Hereinafter, a control flow which is different from a control flow for the charging will be mainly described. Specifically, the control unit 81 of the main controller 80 operates as the operation checking section 83 and the control section 84.

Through the above-described initial operation checking process, the operation checking section 83 determines whether or not there is an error (step S4). When the operation checking section 83 determines that there is no error (No in step S4), the control section 84 connects the relays, and performs normal state control for the devices of the electric motorcycle 1 (step S5). In the normal state control, as described above, the shifting step set for each operation state is performed. Thereby, the operation state shifts, and finally becomes the travelable state. Thus, the normal traveling control is performed.

On the other hand, when the operation checking section 83 determines that there is an error (Yes in step S4), the operation checking section 83 determines whether the electric motorcycle 1 is in a low-degree abnormal state or a high-degree abnormal state (step S6). For example, an abnormality detector connected to the main controller 80 or the battery controller 70 may include a first detector for detecting a first characteristic, and a second detector for detecting a second characteristic different from the first characteristic. When the error is based on the first characteristic detected by the first detector, the operation checking section 83 may determine that the electric motorcycle 1 is in the low-degree abnormal state. On the other hand, when the error is based on the second characteristic detected by the second detector, the operation checking section 83 may determine that the electric motorcycle 1 is in the high-degree abnormal state.

Specifically, the first detector detects the numeric value of at least one indication indicating the state of the electric motorcycle 1. For example, the first characteristic includes the temperatures of the inverter 20, the electric motor 5, the battery cell 61, the battery pack 60, or the like, the value of a current flowing through the power wire 31, the bank angle of the electric motorcycle 1, the flow rate of a cooling medium used to cool the electric motor 5, etc. Specifically, the cell monitoring units 65, the current sensors 53a, 53b, the temperature sensors 127, 128, etc., function as the first detector. A range of the value of a normal state and a range of the value of the high-degree abnormal state are pre-set in the memory 82 of the main controller 80 connected to the first detector or the memory 72 of the battery controller 70 connected to the first detector. When at least one of the detected values exceeds the corresponding value of the normal state and becomes less than the range of the value of the high-degree abnormal state, the operation checking section 83 determines that the electric motorcycle 1 is in the low-degree abnormal state.

In particular, regarding the abnormal state in which the temperature becomes higher than a predetermined value, this temperature tends to be naturally lowered. In many cases, the temperature is lowered while the electric motorcycle 1 is traveling. In view of this, the control section 84 may determine that this error can be resolved soon thereafter and the electric motorcycle 1 can go back to the normal state. This makes it possible to reduce frequent occurrence of the high-degree abnormal state.

The second characteristic detected by the second detector includes, for example, falling of the electric motorcycle 1, other state abnormalities of the electric motorcycle 1, electric circuit failure abnormalities of the relays or the like, sensor abnormalities, failure abnormalities of controlled targets, etc. For example, the second detector may include the control units 81, 71 which output control commands to the controlled targets, respectively, and specified sensors which detect the corresponding responses, respectively. The second detector which detects the electric circuit failure abnormalities of the relays or the like may include the current sensors provided on the wires including the relays, like the current sensors 53a, 53b corresponding to the traveling relays 35 to 37. In addition to or instead of this, a relay having an abnormality detection function may be connected to the main controller 80 or the battery controller 70 and serve as the second detector. The second detector which detects the falling of the electric motorcycle 1 may include the falling sensor 126. Each of these second detectors may send an electric signal to the corresponding control unit 81, 71, when the failure states have occurred. In this configuration, when the main controller 80 or the battery controller 70 receives the electric signal from the second detector, the operation checking section 83 determines that the electric motorcycle 1 is in the high-degree abnormal state. Instead of this, the control unit 81, 71 may determine that the electric motorcycle 1 has a failure, namely, the electric motorcycle 1 is in the high-degree abnormal state, based on the detected value sent from the second detector.

When the operation checking section 83, 73 determines that the electric motorcycle 1 is in the low-degree abnormal state or in the high-degree abnormal state, the corresponding controller 80, 70 stores the type of the abnormality (high-degree abnormal state or low-degree abnormal state) and a cause of this abnormality (abnormality detector which has detected this abnormality, or the like), in the memory 82, 72, as an abnormality history. Specifically, for example, the abnormality history associated with the battery unit 100 is stored in the memory 72 of the battery controller 70, while the abnormality history associated with the inverter 20 or the like is stored in the memory 82 of the main controller 80. The abnormality history stored in one of the memories 82, 72 may be shared by the other of the memories 82, 72.

When the operation checking section 83 determines that the electric motorcycle 1 is in the low-degree abnormal state (Yes in step S6), the control section 84 does not terminate the shifting step and performs a predetermined control (low-degree abnormal state control) different from the normal state control, for the electric motorcycle 1 (step S7). As will be described later, the phrase "the control section 84 does not terminate the shifting step" is meant to include a case where the control section 84 performs the shifting step different from that in the normal state control, as well as a case where the shifting step which is the same as those in the normal state control is maintained.

When the operation checking section 83 determines that the electric motorcycle 1 is in the high-degree abnormal state (No in step S6), the control section 84 terminates the shifting step and performs the high-degree abnormal state control for shifting the electric motorcycle 1 to an operation inhibiting state (traveling inhibiting state) (step S8, step S9). The control section 84 continues the high-degree abnormal state control until the operation checking process 83 determines that the electric motorcycle 1 is operable normally, in the initial operation checking process, after the operation checking section 83 determined that the electric motorcycle 1 was in the high-degree abnormal state. More specifically, when the operation checking section 83 determines that the electric motorcycle 1 is in the high-degree abnormal state, the control section 84 shifts to the high-degree abnormal state control (step S8). After that, unless the main switch 121 is turned OFF (Yes in step S9), and the user riding in the electric motorcycle 1 turns ON the main switch 121 again, the reset (step S2) of the control state does not take place, and the control section 84 does not go back to the normal state control.

When the main switch 121 continues to be ON during the normal state control or the low-degree abnormal state control (No in step S10), the operation checking section 83 performs a continued operation checking process for checking whether or not the electric motorcycle 1 is operable normally (step S11). In the continued operation checking process, the control unit 81 of the main controller 80 operates as the operation checking process 83, except the charging. The control unit 71 of the battery controller 70 detects the signal from the abnormality detector which is associated with the battery unit 100, sends this signal to the main controller 80, and controls the operation of the battery unit 100 in response to a command from the main controller 80.

For example, the continued operation checking process may be performed in such a manner that the detected value which the abnormality detector continues to output is monitored continuously after the initial operation checking process. Instead of this, the continued operation checking process may be performed after every passage of a specified amount of time, or every shift of a particular state, such as the stopping of traveling of the electric motorcycle 1. Further, these may be combined.

In the continued operation checking process, only the detection of the signal from the abnormality detector which can detect the signal during traveling is performed, and the system check of FIG. 6 is not performed. The operation checking section 83 monitors whether or not each of the relays is disconnected, and determines that there is an error if the operation checking section 83 detects that any one of the relays is disconnected. The process performed by the control section 84 which takes place after the continued operation checking process is similar to the initial operation checking process (step S4 to S8).

When the operation checking section 83 determines that the electric motorcycle 1 has been restored from the low-degree abnormal state in the continued operation checking process, after the operation checking section 83 determined that the electric motorcycle 1 was in the low-degree abnormal state (after step S7, through step S11, and No in step S4), the control section 84 performs the normal state control (step S5). In other words, after the electric motorcycle 1 has been restored from the low-degree abnormal state, the control section 84 can permit the electric motorcycle 1 to shift to the operable state (travelable state or chargeable state) without undergoing the initial operation checking process.

When the main switch 121 is turned OFF (Yes in step S9 or step S10), the low-voltage relay 101 is disconnected.

Although in the present embodiment, the continued operation checking process is performed in the normal state control and the low-degree abnormal state control, it may be performed only in the low-degree abnormal state control. Further, the continued operation checking process in the low-degree abnormal state control may be made different from the continued operation checking process in the normal state control. For example, in the continued operation checking process in the low-degree abnormal state control, the operation checking section 83 may determine whether or not a certain state determined as being the low-degree abnormal state has been restored to a normal range, and/or the certain state falls into the range of the high-degree abnormal state.

In accordance with the above-described configuration, an error mode (low-degree abnormal state) in which the electric motorcycle 1 can go back to the normal state control is provided separately from an error mode (high-degree abnormal state) in which the step for shifting the electric motorcycle 1 to the operable state is terminated, when the abnormality takes place in the electric motorcycle 1. Therefore, in a case where an incorrect detection takes place or a minor error takes place and the electric motorcycle 1 can go back to the normal state, the control section 84 can permit the electric motorcycle 1 to shift to the operable state without undergoing the shifting step again from the beginning, which takes time, at a time point when the minor error has been resolved. In other words, in a case where the operation checking section 83 determines that the electric motorcycle 1 is in the low-degree abnormal state and the electric motorcycle 1 can go back to the normal state soon thereafter, the electric motorcycle 1 can go back to the normal state control without undergoing the initial operation checking process for checking the operations of the switching elements, which takes time. Therefore, in a case where a minor abnormality takes place and the electric motorcycle 1 can go back to the normal state, because of a noise or a detection of an instantaneous abnormality, this is detected, and the electric motorcycle 1 is permitted to go back to the normal state control quickly at the time point when this abnormality has been resolved. This can improve convenience to the user. Also, in a case where a fine abnormal state is detected, for which it is difficult to immediately determine whether or not the electric motorcycle 1 should be inhibited from shifting to the operable state or maintaining the operable state, this abnormal state may be determined as the low-degree abnormal state in which the electric motorcycle 1 can go back to the normal state control. In this way, the determination as to whether or not to terminate the step for shifting the electric motorcycle 1 to the operable state is deferred. This makes it possible to absorb a tolerance, a variation, or a noise, and improve the reliability and stability of the system. In particular, by using the above-described configuration in the motorcycle such as the electric motorcycle 1 of the present embodiment, it becomes possible to reduce the number of occasions in which a control for shutting down the driving power is suddenly performed, when an abnormality takes place while the motorcycle is traveling less stably than a four-wheeled automobile is, for structural reasons.

The control process different from that of the normal state control, which is performed in the low-degree abnormal state control, includes changing the control content by the shifting step which is the same as that of the normal state control (e.g., limiting an output), changing the shifting step (conditions used for sifting are increased or the electric motorcycle 1 is placed in a stand-by state for a specified time period), without changing the control content, and changing the shifting step and the control content.

Hereinafter, the specific example of the low-degree abnormal state control and the specific control of the high-degree abnormal state control will be described.

For example, as shown in FIG. 4, when the operation checking section 83 determines that the electric motorcycle 1 is in the low-degree abnormal state, in each normal operation state, such as the stand-by state, the control section 84 shifts from the operation state determined as being the low-degree abnormal state to the low-degree abnormal state control mode corresponding to this operation state. In the example of FIG. 4, a control mode used in a case where the electric motorcycle 1 is determined as being in the low-degree abnormal state under the initialization state will be referred to as a low-degree abnormal state control mode 1, while control modes used in cases where the electric motorcycle 1 is in the low-degree abnormal state under the stand-by state, the parking state, the travelable state, and the chargeable state, will be referred to as low-degree abnormal state control modes 2 to 5, respectively.

In each of the low-degree abnormal state control modes 1 to 5, when the step for shifting the electric motorcycle 1 from the corresponding operation state to a next operation state is performed, the control section 84 shifts to the low-degree abnormal state control mode corresponding to the next operation state. For example, when the operation checking section 83 determines that the electric motorcycle 1 is in the low-degree abnormal state, under the stand-by state, the operation state of the electric motorcycle 1 shifts from the stand-by state to the low-degree abnormal state control mode 2. When the start switch 122 is operated to be turned ON, which is the step for shifting the electric motorcycle 1 from the stand-by state to a next operation state (parking state) under this state, the operation state of the electric motorcycle 1 shifts to the low-degree abnormal state control mode 3 corresponding to the parking state without undergoing the continued operation checking process.

The step for shifting the electric motorcycle 1 from a certain operation state to a next operation state under the normal state may be different from the step for shifting the electric motorcycle 1 from the corresponding low-degree abnormal state control mode to a next low-degree abnormal state control mode. For example, the step for shifting the initialization state to the stand-by state is the end of the initial operation checking process, while the step for shifting the low-degree abnormal state control mode 1 to the low-degree abnormal state control mode 2 may be repeating the initial operation checking process multiple times, or performing a predetermined operation input by the rider, after the initial operation checking process was terminated.

In this configuration, even when the operation state of the electric motorcycle 1 is shifted after the operation checking section 83 determined that the electric motorcycle 1 was in the low-degree abnormal state, the operation checking section 83 continues to determine that the electric motorcycle 1 is in the low-degree abnormality state, unless the operation checking section 83 determines that the electric motorcycle 1 has been restored from the low-degree abnormal state. Therefore, even when the control method in the low-degree abnormal state control is varied depending on the operation state of the electric motorcycle 1, the low-degree abnormal state control, corresponding to shifting of the operation state, can be performed quickly without performing the operation checking process again by the operation checking section 83.

Further, regarding the shifting step of the low-degree abnormal state control, in a case where the electric motorcycle 1 is in a particular low-degree abnormal state control mode, this low-degree abnormal state control mode may not shift to a next low-degree abnormal state control mode. For example, in a case where the operation checking section 83 determines that the electric motorcycle 1 is in the low-degree abnormal state under the initialization state and the control section 84 shifts the electric motorcycle 1 to the low-degree abnormal state control mode 1, the control section 84 may continue the low-degree abnormal state control mode 1 without shifting the electric motorcycle 1 to the low-degree abnormal state control mode 2 corresponding to the stand-by state until the electric motorcycle 1 has been restored to the normal state control.

Although in the example of FIG. 4, when the electric motorcycle 1 is shifted from the operation state under the normal state to the high-degree abnormal state, the electric motorcycle 1 undergoes any one of the low-degree abnormal state control modes. However, FIG. 4 illustrates the relation of shifting of the operation state for easier understanding. Therefore, the electric motorcycle 1 can shift from the operation state under the normal state to the high-degree abnormal state, without undergoing any one of the low-degree abnormal state control modes. For example, in the case of a falling of the electric motorcycle 1 which is detected by the falling sensor 126, a collision of the electric motorcycle 1 which is detected by an acceleration sensor (not shown), a ground leakage detected by the battery cell monitoring unit 65, a battery abnormality detected by the current sensor 53*a*, 53*b*, an inverter abnormality in which a difference between a torque command value sent from the main controller 80 to the inverter 20 and a motor output value based on the detected value of the rotational speed sensor 129 of the electric motor 5 is great, a communication abnormality which is a communication failure between the controller 100, 70, and the auxiliary device which is communicable with the controller 100, 70, an operation abnormality (disconnection) of each of the relays, etc., the electric motorcycle 1 may directly shift from the operation state under the normal state to the high-degree abnormal state.

As a matter of course, the electric motorcycle 1 may shift from the operation state under the normal state to the low-degree abnormal state control mode and then to the high-degree abnormal state. For example, the operation checking section 83 determines that the electric motorcycle 1 is in the low-degree abnormal state when the detected value from the abnormality detector falls outside a first predetermined range and falls into a second predetermined range including the first predetermined range, and determines that the electric motorcycle 1 is in the high-degree abnormal state when the detected value from the abnormality detector falls outside the second predetermined range. For example, in a case where the temperature of the inverter 20 which is detected by the inverter temperature sensor 127 is equal to or higher than an upper limit value T1 of the first predetermined range and lower than an upper limit value T2 of the second predetermined range, the operation checking section 83 may determine that the electric motorcycle 1 is in the low-degree abnormal state. On the other hand, in a case where the temperature of the inverter 20 is equal to or higher than the upper limit value T2 of the second predetermined range, the operation checking section 83 may determine that the electric motorcycle 1 is in the high-degree abnormal state.

In accordance with this configuration, even in a case where the error can be resolved and the electric motorcycle 1 can shift to the normal state, if the detected value from the abnormality detector significantly exceeds the first predetermined range which may be assumed as the normal range, the operation checking section 83 determines that the electric motorcycle 1 is in the high-degree abnormal state. In this way, the determination as to whether or not to inhibit the electric motorcycle 1 from shifting to the operable state or maintaining the operable state is deferred. This makes it possible to absorb a tolerance, a variation, or a noise, and improve the reliability and stability of the system.

For example, the operation checking section 83 may determine that the electric motorcycle 1 is in the low-degree abnormal state when the detected value from the abnormality detector falls outside a predetermined range, and determine that the electric motorcycle 1 is in the high-degree abnormal state when the number of times the operation checking section 83 determines that the electric motorcycle 1 is in the low-degree abnormal state becomes a predetermined number or more. Further, for example, the operation checking section 83 may determine that the electric motorcycle 1 is in the high-degree abnormal state when the low-degree abnormal state continues for a predetermined time period or longer, after the operation checking section 83 determined that the electric motorcycle 1 was in the low-degree abnormal state. Further, for example, in a case where an event which is determined as the low-degree abnormal state takes place again within a predetermined time period, after the operation checking section 83 determined that the electric motorcycle 1 was in the low-degree abnormal state, the operation checking section 83 may determine that the electric motorcycle 1 is in the high-degree abnormal state.

When the operation checking section 83 determines that the electric motorcycle 1 has an abnormality, the main controller 80 causes a notification unit 120 to notify the user riding on the electric motorcycle 1 of this abnormality. The notification unit 120 makes a notification method of the abnormality different between the low-degree abnormal state and the high-degree abnormal state. The notification unit 120 may turn ON a lamp which is made different between the low-degree abnormal state and the high-degree abnormal state. The notification unit 120 may turn ON the same lamp in a manner made different between the low-degree abnormal state and the high-degree abnormal state. For example, the notification unit 20 may vary the blinking speed of the lamp, or blink the lamp in one of the low-degree abnormal state and the high-degree abnormal state, and turn ON the lamp in the other of the low-degree abnormal state and the high-degree abnormal state. Further, the notification unit 20 may display on a display unit such as a liquid crystal display unit, "SLOW" in the low-degree abnormal state, and "EMERGENCY" in the high-degree abnormal state. Further, the notification unit 120 emits a buzzer sound, a melody, or a voice which is made different between the low-degree abnormal state and the high-degree abnormal state. In accordance with this configuration, in the case of the abnormality, the user riding the electric motorcycle 1 immediately can know whether the electric motorcycle 1 is in the low-degree abnormal state or in the high-degree abnormal state.

Depending on the cause of the low-degree abnormal state, occurrence of an error may be merely stored in the corresponding memory 82, 72 as an abnormality history, without notifying the user riding the electric motorcycle 1 of this error. For example, the user riding the electric motorcycle 1 may not be notified of a minor error based on the temperature of the battery pack 60. This can remove the burden of the system check or the like on the user riding the electric motorcycle 1. In addition, since the corresponding controller 100, 70 can manage the abnormality history, the operation checking section 83 can determine that the electric motorcycle 1 is in the high-degree abnormal state at an earlier time and properly, if the same error continues or an error associated with this error takes place.

In the low-degree abnormal state control mode, the control section 84 may use various control methods. For example, in the low-degree abnormal state control, the control section 84 may permit the electric motorcycle 1 to shift to the travelable state and limit the traveling capability of the electric motorcycle 1 in the travelable state. In this case, when the operation checking section 83 determines that the electric motorcycle 1 has been restored from the low-degree abnormal state, the control section 84 may terminate limiting the traveling capability of the electric motorcycle 1.

Instead of this, when the operation checking section 83 determines that the electric motorcycle 1 is in the low-degree abnormal state, the control section 84 may defer shifting the electric motorcycle 1 to the operable state, until the operation checking section 83 determines that the electric motorcycle 1 has been restored from the low-degree abnormal state. For example, the control section 84 defers shifting the electric motorcycle 1 to the travelable state in a case where the operation state of the electric motorcycle 1 is different from the travelable state.

For example, in a case where the operation checking section 83 determines that the electric motorcycle 1 is in the low-degree abnormal state, even after the initial operation checking process has been repeated multiple times, in the low-degree abnormal state control mode 1 corresponding to the initialization state, the operation checking section 83 may determine that the electric motorcycle 1 is in the high-degree abnormal state. For example, the main controller 80 may not accept a command provided by operating the start switch 122 in the low-degree abnormal state control mode 2 corresponding to the stand-by state, and thus may inhibit the electric motorcycle 1 from shifting to the parking state or the low-degree abnormal state control mode 3 corresponding to the parking state. For example, the main controller 80 may not accept a command provided by operating an accelerator or the like in the low-degree abnormal state control mode 3, and thus may inhibit the electric motorcycle 1 from traveling.

As described above, in order to inhibit the electric motorcycle 1 from shifting to the operable state, the control section 84 may defer shifting to the next low-degree abnormal state control mode.

Instead of this, the control section 84 may limit the operation of the electric motorcycle 1 as the low-degree abnormal state control in the low-degree abnormal state control mode 4, while permitting the electric motorcycle 1 to shift to the low-degree abnormal state control mode 4 corresponding to the travelable state. For example, in a case where the operation state of the electric motorcycle 1 is the low-degree abnormal state control mode 4 in a state in which the electric motorcycle 1 is stopped, the control section 84 may inhibit the electric motorcycle 1 from traveling until the operation checking section 83 determines that the electric motorcycle 1 is operable normally, in the continued operation checking process thereafter. Instead of this, the control section 84 may limit the operation state of the electric motorcycle 1 only when the electric motorcycle 1 is traveling under a particular condition (e.g., the electric motorcycle 1 is traveling slowly, in a forward direction, or in a backward direction).

In a case where the operation checking section 83 determines that the electric motorcycle 1 is in the low-degree abnormal state, while the electric motorcycle 1 is in the travelable state and is traveling, the control section 84 may maintain the travelable state of the electric motorcycle 1 while limiting the traveling capability of the electric motorcycle 1. After the electric motorcycle 1 is stopped, the control section 84 may defer shifting the electric motorcycle 1 to the travelable state until the operation checking section 83 determines that the electric motorcycle 1 is operable normally in the continued operation checking process. For example, limiting the traveling capability of the electric motorcycle 1 includes limiting the maximum output of the electric motor 5, limiting the speed, and limiting the voltage supplied from the battery pack 60.

When the control section 84 shifts the electric motorcycle 1 to the traveling inhibiting state or defers shifting the electric motorcycle 1 to the travelable state, the control section 84 may switch the traveling relays 35 to 37 so that the electric power supplied from the battery pack 60 to the electric motor 5 is cut off. In accordance with this configuration, when the operation checking section 83 determines that the electric motorcycle 1 is in the high-degree abnormal state or in the low-degree abnormal state, the control section 84 disconnects the traveling relays 35 to 37 so that the electric power supplied from the battery pack 60 to the electric motor 5 is cut off, in order to stop traveling of the electric motorcycle 1. This makes it possible to reliably inhibit the electric motorcycle 1 from shifting to the travelable state. Alternatively, the control section 84 may not accept or may ignore an input to the main controller 80, such as the command of the accelerator operation or the like.

In a case where the electric motorcycle 1 is traveling while limiting the traveling capability under the low-degree abnormal state control at a time point when the operation checking section 83 determines that the electric motorcycle 1 has been restored from the low-degree abnormal state, the control section 84 may perform a gradual reduction control for gradually reducing a degree with which the traveling capability is limited, over time. Instead of this gradual reduction control, the control section 84 may determine whether or not a predetermined timing condition in which limiting the traveling capability is terminated is met, and may terminate limiting the traveling capability when this condition is met.

In accordance with this configuration, the control section 84 performs the above-described gradual reduction control in a period from when the electric motorcycle 1 shifts from the low-degree abnormal state control to the normal state control while the electric motorcycle 1 is traveling, or the control section 84 places the electric motorcycle 1 in the stand-by state until a timing at which an impact is not likely to occur in the electric motorcycle 1 even when the electric motorcycle 1 shifts from the low-degree abnormal state control to the normal state control. This can make it difficult to generate the impact in the electric motorcycle 1 when the electric motorcycle 1 which is traveling is restored from the low-degree abnormal state control to the normal state control. The above-described predetermined timing condition in which limiting the traveling capability is terminated may include, for example, a state in which the electric motorcycle is stopped, a state in which the electric motorcycle 1 is traveling at a low speed, a state in which the electric motorcycle 1 is decelerated, a state in which gear change takes place, a state in which the driving power transmitted to the drive train is cut off, a regenerative state, an unaccelerated state, a state in which the accelerator operation is terminated, etc.

The control section 84 may perform a different low-degree abnormal-state control, depending on a cause determined as being the low-degree abnormal state. For example, in a case where the operation checking section 83 determines that the electric motorcycle 1 is in the low-degree abnormal state due to the fact that the temperature of the battery pack 60 is high, the control section 84 may permit the electric motorcycle 1 to shift to the travelable state. Or, in a case where the operation checking section 83 determines that the electric motorcycle 1 is in the low-degree abnormal state due to the fact that the temperature of the inverter 20 is high, the control section 84 may defer shifting the electric motorcycle 1 to the travelable state. In the case where the temperature of the battery pack 60 is high, the electric motorcycle 1 may travel so that the battery pack 60 is exposed to ram air. Thus, cooling of the battery pack 60 is facilitated. In the case where the temperature of the inverter 20 is high, control section 84 may defer shifting the electric motorcycle 1 to the travelable state, and cease switching control for the inverter 20. Thus, cooling of the inverter 20 is facilitated. In this way, proper control can be performed depending on the cause determined as the low-degree abnormal state. This makes it possible for the electric motorcycle 1 to be easily restored from the low-degree abnormal state or urge the electric motorcycle 1 to shift to the high-degree abnormal state.

In the present embodiment, in a case where the operation checking section 83 determines that the electric motorcycle 1 is in the high-degree abnormal state, the control unit 81 of the main controller 80 which operates as the control section 84 outputs to the control unit 71 of the battery controller 70, the command for cutting-off the electric power supplied from the battery pack 60 to the electric motor 5. In response to this command, the control unit 71 of the battery controller 70 disconnects the traveling relays 35 to 37.

In a case where the electric motorcycle 1 is traveling at a time point when the operation checking section 83 determines that the electric motorcycle 1 is in the high-degree abnormal state, the control section 84 may maintain the travelable state of the electric motorcycle 1 while limiting the traveling capability of the electric motorcycle 1. After the electric motorcycle 1 is stopped, the main switch 121 is turned OFF, and then turned ON again, and the control section 84 may defer shifting the electric motorcycle 1 to the operable state until the operation checking section 83 determines that the electric motorcycle 1 is operable normally, in the initial operation checking process.

In accordance with this configuration, in a case where the operation checking section 83 determines that the electric motorcycle 1 is in the high-degree abnormal state while the motorcycle 1 is traveling, the control section 84 maintains the travelable state of the electric motorcycle 1 while limiting the traveling capability of the electric motorcycle 1. This can assist the user riding the electric motorcycle 1 to pull over the electric motorcycle 1 to the side of a road, for example. After the electric motorcycle 1 is stopped, the control section 84 defers shifting the electric motorcycle 1 to the operable state until the operation checking section 83 determines again that the electric motorcycle 1 is operable normally, in the initial operation checking process. In this way, the reliability and stability of the system can be secured.

In a case where the main switch 121 is turned OFF and then is turned ON again, after the operation checking section 83 determined that the electric motorcycle 1 was in the high-degree abnormal state, the operation checking section 83 may perform the initial operation checking process at a frequency higher than that under the normal state. For example, the operation checking section 83 may perform the initial operation checking process multiple times, although the operation checking section 83 performs the initial operation checking process once under the normal state, or perform the initial operation checking process for a longer period of time. Further, the operation checking section 83 may change the content (the number of times, or items) of the initial operation checking process based on the abnormality history stored in the memory 82, 72. For example, in a case where the memory 82, 72 contains the abnormality history indicating that the electric motorcycle 1 fell and shifted to the high-degree abnormal state in the past, the control section 84 may perform the operation check (system check) of the traveling relays 35 to 37 multiple times to carefully confirm whether or not the traveling relays 35 to 37 are damaged due to the falling.

Although in the above-described embodiment, the operation checking control during the traveling of the electric motorcycle 1 in the case where the cylinder lock 10 is placed in the main switch ON position has been described above, the present embodiment is applied in a similar manner to the operation checking control during the charging of the electric motorcycle 1 in the case where the cylinder lock 10 is placed in the charging position.

Specifically, in a case where the control unit 71 of the battery controller 70 which operates as the operation checking section 73 determines that the electric motorcycle 1 is operable normally, the control unit 71 of the battery controller 70 which operates as the control section 74 performs the shifting step and permits the electric motorcycle 1 to shift to the chargeable state of the battery pack 60 which is the electric power supply of the electric motorcycle 1, and performs a normal charging operation control. In the normal charging operation control, the control section 74 confirms the connection between the charging connector 49 and the outside electric power supply 90, and provides a charging command to the outside electric power supply 90. The cell monitoring unit 65 monitors the SOC of the battery pack 60 for each of the battery cells 61.

In a case where the operation checking process 73 determines that the electric motorcycle 1 is in a predetermined high-degree abnormal state, in the initial operation checking process or the continued operation checking process, the control section 4 terminates the shifting step, and shifts the electric motorcycle 1 to a charging operation inhibiting state in which charging of the battery pack 60 is inhibited. On the other hand, in a case where the operation checking process 73 determines that the electric motorcycle 1 is in the low-degree abnormal state different from the high-degree abnormal state, the control section 74 shifts the electric motorcycle 1 to the low-degree abnormal state control mode 5. The control section 74 does not terminate the shifting step, and performs a predetermined low-degree abnormal state control different from that in the normal state, regarding the charging for the battery pack 60. For example, in the low-degree abnormal state control mode 5 corresponding to the chargeable state, the charging may not be started. In a case where the operation checking section 73 determines that the electric motorcycle 1 has been restored from the low-degree abnormal state in the continued operation checking process after the operation checking section 73 determined that the electric motorcycle 1 was in the low-degree abnormal state, the control section 74 performs the shifting step, permits the electric motorcycle 1 to shift to the chargeable state for the battery pack 60, and performs the normal charging operation control.

In the present embodiment, the battery unit 100 is detachably mounted to the electric motorcycle 1 in a state in which the battery pack 60 and the relays 35 to 37, 48, 51 to 52 are integrated as a unit. In this configuration, it becomes possible to easily perform the control in the high-degree abnormal state in a state in which the relays are disconnected for each battery unit 100 as a single unit.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is effectively used to improve convenience to a user, while detecting an abnormality properly, in a vehicle and an electric power supply unit incorporated in the vehicle.

LIST OF REFERENCE CHARACTERS 1 electric motorcycle (vehicle)
5 electric motor
35, 36, 37 traveling relay
48 DC/DC converter relay
49 charging connector
50 charging wire
51, 52 charging relay
53a, 53b current sensor
60 battery pack
65 cell monitoring unit
70 battery controller
71, 81 control unit
72, 82 memory
73, 83 operation checking section
74, 84 control section
80 main controller
90 outside electric power supply
101 low-voltage relay
120 notification unit

The invention claimed is:

1. A vehicle comprising:
an operation checking section which performs a predetermined operation checking process to confirm whether or not the vehicle is operable normally, before the vehicle starts traveling;
a control section which controls the vehicle according to a specified shifting step for shifting the vehicle to an operable state;
an electric power supply;
an electric motor which drives the vehicle using electric power supplied from the electric power supply; and
a switching element which performs switching between a state in which the electric power is supplied from the electric power supply to the electric motor, and a state in which the electric power supplied from the electric power supply to the electric motor is cut off,
wherein the operation checking section is configured to perform the predetermined operation checking process to determine whether or not the vehicle is in a predetermined high-degree abnormal state or in a predetermined low-degree abnormal state different from the predetermined high-degree abnormal state, before the vehicle starts traveling,
wherein the control section is configured to perform a normal state control in which the control section performs the specified shifting step to shift the vehicle to the operable state when the operation checking section determines that the vehicle is operable normally,
wherein the control section is configured to perform a high-degree abnormal state control in which the control section terminates the specified shifting step and shifts the vehicle to an operation inhibiting state in which traveling of the vehicle is inhibited, when the operation checking section determines that the vehicle is in the predetermined high-degree abnormal state,
wherein the control section is configured to perform a low-degree abnormal state control different from the normal state control without terminating the specified shifting step, and perform the specified shifting step, when the operation checking section determines that the vehicle is in the predetermined low-degree abnormal state, and perform the normal state control, when the operation checking section determines that the vehicle has been restored from the predetermined low-degree abnormal state to a state in which the vehicle is operable normally,
wherein the operation checking section performs the predetermined operation checking process in such a manner that the operation checking section determines whether or not the switching element is operable normally,
wherein the predetermined high-degree abnormal state includes a state in which the switching element is not operable normally,
wherein the predetermined low-degree abnormal state does not include the state in which the switching element is not operable normally, and
wherein the control section is configured to perform the predetermined operation checking process for the switching element again when the operation checking section determines that the vehicle is in the predetermined high-degree abnormal state, and perform the specified shifting step without performing the predetermined operation checking process for the switching element again when the operation checking section determines that the vehicle is in the predetermined low-degree abnormal state.

2. The vehicle according to claim 1,
wherein the specified shifting step in the normal state control is different from the specified shifting step in the low-degree abnormal state control.

3. The vehicle according to claim 1,
wherein the control section is configured to perform the low-degree abnormal state control for limiting a traveling capability of the vehicle in such a manner that the control section makes the traveling capability lower in the low-degree abnormal state control than in the normal state control, when the operation checking section determines that the vehicle is in the predetermined low-degree abnormal state, and terminate limiting the traveling capability of the vehicle, when the operation checking section determines that the vehicle has been restored from the predetermined low-degree abnormal state.

4. The vehicle according to claim 1,
wherein the control section is configured to perform the low-degree abnormal state control in such a manner that the control section defers performing the specified shifting step, until the operation checking section determines that the vehicle has been restored from the predetermined low-degree abnormal state, when the operation checking section determines that the vehicle is in the predetermined low-degree abnormal state.

5. The vehicle according to claim 1,
wherein the control section is configured to perform the low-degree abnormal state control which is made different depending on a cause determined as being the predetermined low-degree abnormal state.

6. The vehicle according to claim 1, comprising:
an abnormality detector which detects an abnormality of the vehicle,
wherein the operation checking section is configured to:
determine that the vehicle is in the predetermined low-degree abnormal state, when a detected value from the abnormality detector falls outside a first predetermined range and falls into a second predetermined range including the first predetermined range, and
determine that the vehicle is in the predetermined high-degree abnormal state, when the detected value from the abnormality detector falls outside the second predetermined range.

7. The vehicle according to claim 1, comprising:
an abnormality detector which detects an abnormality of the vehicle,
wherein the abnormality detector includes a first detector which detects a first predetermined characteristic of the vehicle, and a second detector which detects a second predetermined characteristic of the vehicle which is different from the first predetermined characteristic, and
wherein the operation checking section is configured to determine whether or not the vehicle is in the predetermined low-degree abnormal state based on the first characteristic, and determine whether or not the vehicle is in the predetermined high-degree abnormal state based on the second characteristic.

8. The vehicle according to claim 7,
wherein the first detector is configured to detect a numeric value of at least one indication indicating a state of the vehicle, and
wherein the operation checking section is configured to determine that the vehicle is in the predetermined low-degree abnormal state, when the numeric value falls outside a predetermined range.

9. The vehicle according to claim 7,
wherein the second detector is configured to detect at least one of a state abnormality of the vehicle, an electric circuit failure abnormality, a sensor failure abnormality, and a failure abnormality of a controlled target, and
wherein the operation checking section is configured to determine that the vehicle is in the predetermined high-degree abnormal state, when the second detector detects the abnormality.

10. The vehicle according to claim 1, comprising:
a notification section which notifies a user riding on the vehicle of an abnormality when the operation checking section determines that the vehicle has the abnormality,
wherein the notification section is configured to make a notification method different between the predetermined low-degree abnormal state and the predetermined high-degree abnormal state.

11. A vehicle comprising:
an operation checking section which performs a predetermined operation checking process to confirm whether or not the vehicle is operable normally, before the vehicle starts traveling; and
a control section which controls the vehicle according to a specified shifting step for shifting the vehicle to an operable state,
wherein the operation checking section is configured to perform the predetermined operation checking process to determine whether or not the vehicle is in a predetermined high-degree abnormal state or in a predetermined low-degree abnormal state different from the predetermined high-degree abnormal state, before the vehicle starts traveling,
wherein the control section is configured to perform a normal state control in which the control section performs the specified shifting step to shift the vehicle to the operable state when the operation checking section determines that the vehicle is operable normally,
wherein the control section is configured to perform a high-degree abnormal state control in which the control section terminates the specified shifting step and shifts the vehicle to an operation inhibiting state when the operation checking section determines that the vehicle is in the predetermined high-degree abnormal state,
wherein the control section is configured to perform a low-degree abnormal state control different from the normal state control without terminating the specified shifting step, and perform the specified shifting step, when the operation checking section determines that the vehicle is in the predetermined low-degree abnormal state, and perform the normal state control, when the operation checking section determines that the vehicle has been restored from the predetermined low-degree abnormal state to a state in which the vehicle is operable normally,
wherein the control section is configured to perform the low-degree abnormal state control for limiting a traveling capability of the vehicle in such a manner that the control section makes the traveling capability lower in the low-degree abnormal state control than in the normal state control, when the operation checking section determines that the vehicle is in the predetermined low-degree abnormal state, and terminate limiting the traveling capability of the vehicle, when the operation checking section determines that the vehicle has been restored from the predetermined low-degree abnormal state, and
wherein the control section is configured to, when the operation checking section determines that the vehicle has been restored from the predetermined low-degree abnormal state, in a state in which the vehicle is traveling:
perform gradual reduction control for gradually reducing a degree with which the traveling capability is limited, over time, or
determine whether or not a predetermined timing condition in which limiting the traveling capability is terminated is met, and terminate limiting the traveling capability when the predetermined timing condition is met.

12. A vehicle comprising:
an operation checking section which performs a predetermined operation checking process to confirm whether or not the vehicle is operable normally, before the vehicle starts traveling; and
a control section which controls the vehicle according to a specified shifting step for shifting the vehicle to an operable state,
wherein the operation checking section is configured to perform the predetermined operation checking process to determine whether or not the vehicle is in a predetermined high-degree abnormal state or in a predetermined low-degree abnormal state different from the predetermined high-degree abnormal state, before the vehicle starts traveling,
wherein the control section is configured to perform a normal state control in which the control section performs the specified shifting step to shift the vehicle to the operable state when the operation checking section determines that the vehicle is operable normally, wherein the control section is configured to perform a high-degree abnormal state control in which the control section terminates the specified shifting step and shifts the vehicle to an operation inhibiting state when the operation checking section determines that the vehicle is in the predetermined high-degree abnormal state, wherein the control section is configured to perform a low-degree abnormal state control different from the normal state control without terminating the specified shifting step, and perform the specified shifting step, when the operation checking section determines that the vehicle is in the predetermined low-degree abnormal state, and perform the normal state control, when the operation checking section determines that the vehicle has been restored from the predetermined low-degree abnormal state to a state in which the vehicle is operable normally, and wherein the control section is configured to, when the operation checking section determines that the vehicle is in the predetermined high-degree abnormal state:
  maintain the operable state of the vehicle while limiting a traveling capability of the vehicle, in a state in which the vehicle is traveling, and
  inhibit the vehicle from shifting to the operable state, after the vehicle is stopped.

\* \* \* \* \*